(12) United States Patent
Sakatani

(10) Patent No.: US 12,450,725 B2
(45) Date of Patent: Oct. 21, 2025

(54) IMAGE INSPECTION APPARATUS, IMAGE INSPECTION METHOD OF IMAGE INSPECTION APPARATUS, AND IMAGE INSPECTION SYSTEM

(71) Applicant: Konica Minolta, Inc., Tokyo (JP)

(72) Inventor: Kazuomi Sakatani, Machida (JP)

(73) Assignee: Konica Minolta Inc., Tokyo (JP)

( * ) Notice: Subject to any disclaimer, the term of this patent is extended or adjusted under 35 U.S.C. 154(b) by 152 days.

(21) Appl. No.: 18/049,629

(22) Filed: Oct. 26, 2022

(65) Prior Publication Data

US 2023/0132446 A1 May 4, 2023

(30) Foreign Application Priority Data

Nov. 1, 2021 (JP) ................................. 2021-178606

(51) Int. Cl.
*G06T 7/00* (2017.01)
*H04N 1/00* (2006.01)

(52) U.S. Cl.
CPC ......... *G06T 7/001* (2013.01); *H04N 1/00795* (2013.01); *G06T 2207/10008* (2013.01); *G06T 2207/20021* (2013.01); *G06T 2207/30144* (2013.01)

(58) Field of Classification Search
CPC .......... G06T 7/001; G06T 2207/10008; G06T 2207/20021; G06T 2207/30144; G06T 7/0002; G06T 7/11; H04N 1/00795; H04N 1/00015; H04N 1/00029; H04N 1/00076; H04N 1/0044; H04N 1/00005; H04N 1/00013; G03G 15/5062
See application file for complete search history.

(56) References Cited

U.S. PATENT DOCUMENTS

2009/0059312 A1\* 3/2009 Kitahara ............ H04N 1/00278
358/448
2017/0278238 A1\* 9/2017 Noji ....................... A61B 6/486
2018/0288259 A1\* 10/2018 Mizuno .............. H04N 1/00809

FOREIGN PATENT DOCUMENTS

JP 2000172844 A 6/2000
JP 2017193075 A 10/2017
JP 2017202627 A 11/2017
(Continued)

OTHER PUBLICATIONS

Extended European Search Report issued in corresponding European Patent Application No. EP 22203467.0 dated Mar. 17, 2023 (9 pages).
(Continued)

*Primary Examiner* — Akwasi M Sarpong
*Assistant Examiner* — Michael L Burleson
(74) *Attorney, Agent, or Firm* — Osha Bergman Watanabe & Burton LLP

(57) ABSTRACT

An image inspection apparatus includes: a reader that reads an image formed on a recording medium; a first processor that: inspects a first read image including one of divided images obtained by dividing the image at a predetermined position in a main scanning direction, and generates first inspection image data based on an inspection result of the first read image; and a second processor that: inspects a second read image including another of the divided images obtained by dividing the image, and generates second inspection image data based on an inspection result of the second read image.

14 Claims, 20 Drawing Sheets

(56) References Cited

FOREIGN PATENT DOCUMENTS

JP        2020-011472 A      1/2020
JP        2021063673 A   *  4/2021

OTHER PUBLICATIONS

Office Action issued in corresponding Chinese Application No. 202211334539.1, dated Jun. 30, 2025 (20 pages).
Office Action issued in corresponding Japanese Application No. 2021-178606, dated Aug. 26, 2025 (6 pages).

* cited by examiner

IMAGE INSPECTION APPARATUS, IMAGE INSPECTION METHOD OF IMAGE INSPECTION APPARATUS, AND IMAGE INSPECTION SYSTEM

CROSS-REFERENCE TO RELATED APPLICATIONS

The present application claims priority from Japanese patent Application No. 2021-178606, filed on Nov. 1, 2021, the contents of which are incorporated herein by reference in their entirety.

BACKGROUND

Technical Field

The present invention relates to an image inspection apparatus, an image inspection method of the image inspection apparatus, and an image inspection system.

Description of Related Art

As a technique related to an image inspection apparatus, JP 2020-11472 A discloses a technique that "An image inspection apparatus includes: a reader that reads an image formed on a sheet by an image forming apparatus and generates a read image; a read image analyzer that performs analysis to detect an abnormality in the read image and generates an analysis result; and a file generator that generates a normal image file including the read image in which no abnormality has been detected based on the analysis result." (see Abstract of JP 2020-11472 A).

A maximum sheet size of a normal electrophotographic printer is generally A3 size, which is 297 [mm]×420 [mm]. Meanwhile, in a large one-pass inkjet machine, the maximum sheet size exceeds B2 (515 [mm]×728 [mm]) and is 585 [mm]×750 [mm].

As an image reader for image inspection of a large printer, for example, there is an image reader that acquires a read image of the entire sheet width by a configuration in which two imaging units are connected to each other in parallel. This is because, in general, the configuration in which the two imaging units are connected to each other in parallel is often more advantageous in terms of cost than a case of adopting one imaging unit formed long in a main scanning direction. As a result, the image reader can read two read images divided in the sheet width direction.

Here, two image processors analyze the two read images divided in the sheet width direction in parallel, respectively. In a case where two image processors process two read images in parallel, respectively, a processing speed only need to be a half of that in a case where a single read image is analyzed by one image processor, which is advantageous in terms of cost.

JP 2020-11472 A describes that an analysis result file is generated by analyzing a read image. However, JP 2020-11472 A does not describe generation of an image inspection result in a case where the read image is divided in a sheet width direction, and does not meet a demand for generation of the image inspection result in the case where the read image is divided in the sheet width direction.

SUMMARY

Therefore, one or more embodiments of the present invention suitably generate an image inspection result in a case where a read image is divided in a sheet width direction.

According to an aspect of the present invention, an image inspection apparatus comprises:
a reader that reads an image formed on a recording medium;
a first inspector (i.e., a first processor) that inspects a first read image including one of divisions (or divided images) obtained by dividing the image at a predetermined position in a main scanning direction;
a second inspector (i.e., a second processor) that inspects a second read image including the other of the divisions obtained by dividing the image;
a first generator (i.e., the first processor) that generates first inspection image data related to the first read image based on an inspection result of the first inspector; and
a second generator (i.e., the second processor) that generates second inspection image data related to the second read image based on an inspection result of the second inspector.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Figure 1:
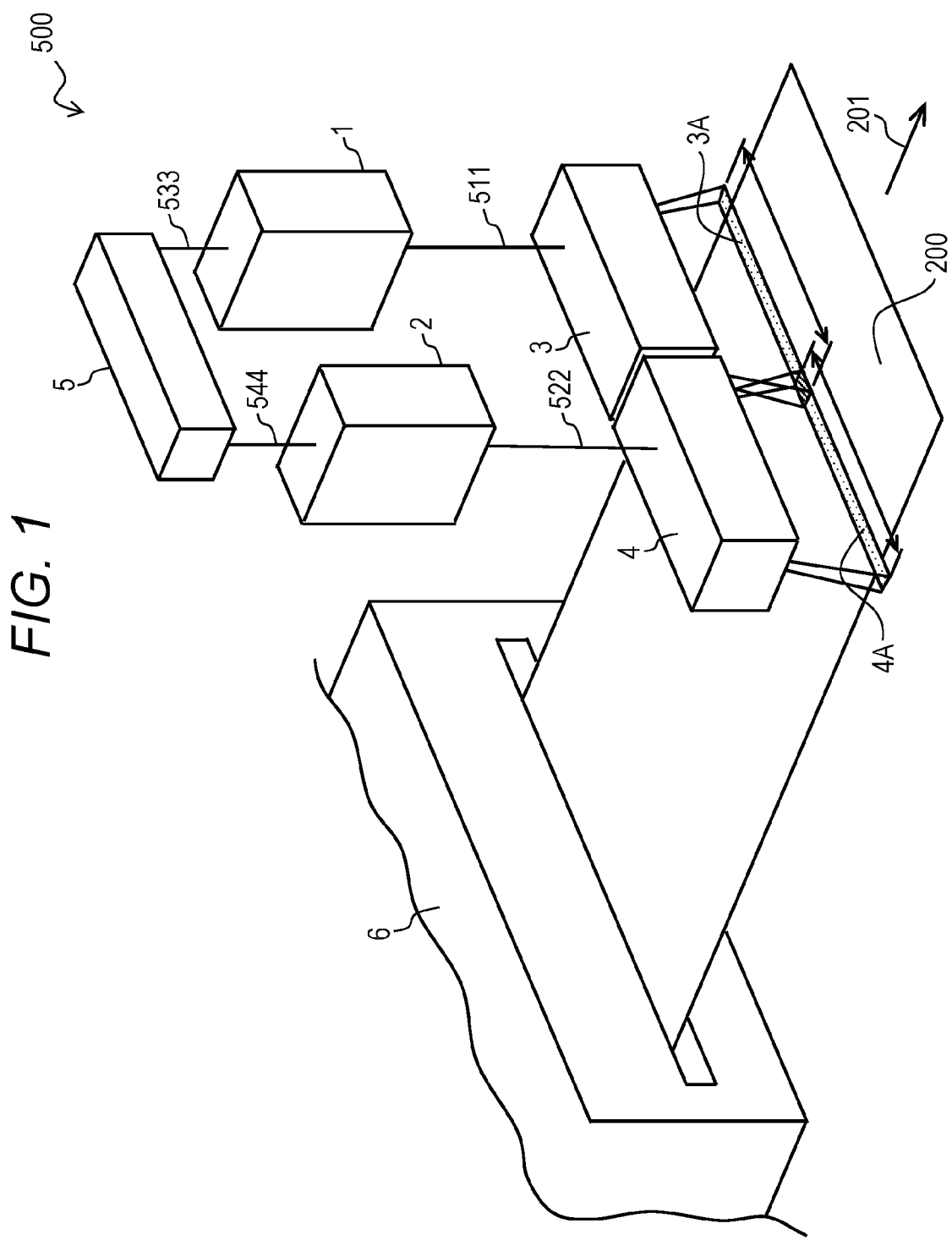
FIG. 1 is an overall configuration diagram of an image inspection system of a first embodiment.

Hereinafter, embodiments of the present invention will be described in detail with reference to the drawings. However, the scope of the invention is not limited to the disclosed embodiments. Note that the embodiments described below are examples for implementing the present invention, and should be appropriately modified or changed according to the configuration of an apparatus to which the present invention is applied and various conditions. In the drawings, the same components are denoted by the same reference numerals, and description thereof is omitted appropriately.

First Embodiment

As illustrated in FIG. 1, an image inspection system 500 of a first embodiment includes two computers 1 and 2 as image inspection apparatuses, two scanners (a first scanner 3 and a second scanner 4) as readers, and a computer 5 as a report generator and an inspection result file generator. As a result, the image inspection system 500 can inspect an image on a printed matter 200 printed by one printer 6 as an image forming apparatus.

The printer 6 outputs the printed matter 200 obtained by printing an image on a recording sheet. The printer 6 can be, for example, a one-pass (single-pass) inkjet printer, but is not limited thereto. After being printed by the printer 6, the printed matter 200 is conveyed in a sub-scanning direction 201 (see FIG. 1) by a known conveyance mechanism (not illustrated). The sub-scanning direction 201 corresponds to a longitudinal direction of the printed matter 200. A main scanning direction corresponds to a lateral direction of the printed matter 200.

The first scanner 3 and the second scanner 4 are a first reader and a second reader that optically read image data printed on the printed matter 200, respectively. Each of the first scanner 3 and the second scanner 4 functions as a reader that reads an image formed on the printed matter 200. The first scanner 3 and the second scanner 4 transmit read image data read from the printed matter 200 to the computers 1 and 2 via the buses 511 and 522, respectively.

Since the first scanner 3 and the second scanner 4 read an image formed on the printed matter 200 as described above, the first scanner 3 and the second scanner 4 are arranged side by side in the main scanning direction. In addition, the first scanner 3 and the second scanner 4 are arranged above the conveyed printed matter 200 by a predetermined distance.

Here, as the first scanner 3 and the second scanner 4, for example, reduction optical system scanners can be adopted. The first scanner 3 scans a scan area 3A including a left half area of the printed matter 200. Specifically, a left end portion of the scan area 3A of the first scanner 3 is on the left of a left sheet end portion of the printed matter 200 by a predetermined number of pixels, and a right end portion of the scan area 3A is on the right of a central portion of a lateral width of the printed matter 200 by a predetermined number of pixels.

The second scanner 4 scans a scan area 4A including a right half area of the printed matter 200. Specifically, a right end portion of the scan area 4A of the second scanner 4 is on the right of a right sheet end portion of the printed matter 200 by a predetermined number of pixels, and a left end portion of the scan area 4A is on the left of a central portion of a lateral width of the printed matter 200 by a predetermined number of pixels.

Therefore, the first scanner 3 and the second scanner 4 arranged side by side can acquire image data of the entire width of the printed matter 200. A central area of the printed matter 200 is scanned by both the first scanner 3 and the second scanner 4.

Each of the computers 1 and 2 is an image inspection apparatus that inspects a defect of an image on the printed matter 200 output from the printer 6. The printed matter 200 is a recording medium on which an image is formed by the printer 6. The computer 1 is communicably connected to the first scanner 3 by the bus 511. The computer 2 is communicably connected to the second scanner 4 by the bus 512. The buses 511 and 522 are each, for example, a camera link, but are not limited thereto. The computer 1 compares read image data read from the left side of the printed matter 200 by the first scanner 3 with correct image data and inspects an image defect. The computer 2 compares read image data read from the right side of the printed matter 200 by the second scanner 4 with correct image data and inspects an image defect.

In addition, the computers 1 and 2 are communicably connected to the computer 5 by buses 533 and 544, respectively, and can exchange predetermined information with the computer 5.

The computer 5 includes a report generator 51 and an inspection result file generator 52 described later. Since the computer 5 includes the report generator 51, the computer 5 generates a report (report data) based on image data acquired from the computers 1 and 2. Since the computer 5 includes the inspection result file generator 52, the computer 5 generates an inspection result file from a report (report data) created by the report generator 51.

In the generated inspection result file, the left side of an image formed on each sheet is arranged on an odd page, and the right side of the image formed on each sheet is arranged on an even page. As a result, a user can view the inspection result file in a double-page spread manner, and therefore can suitably check the entire printed matter.

<Hardware Configuration>

Figure 2:
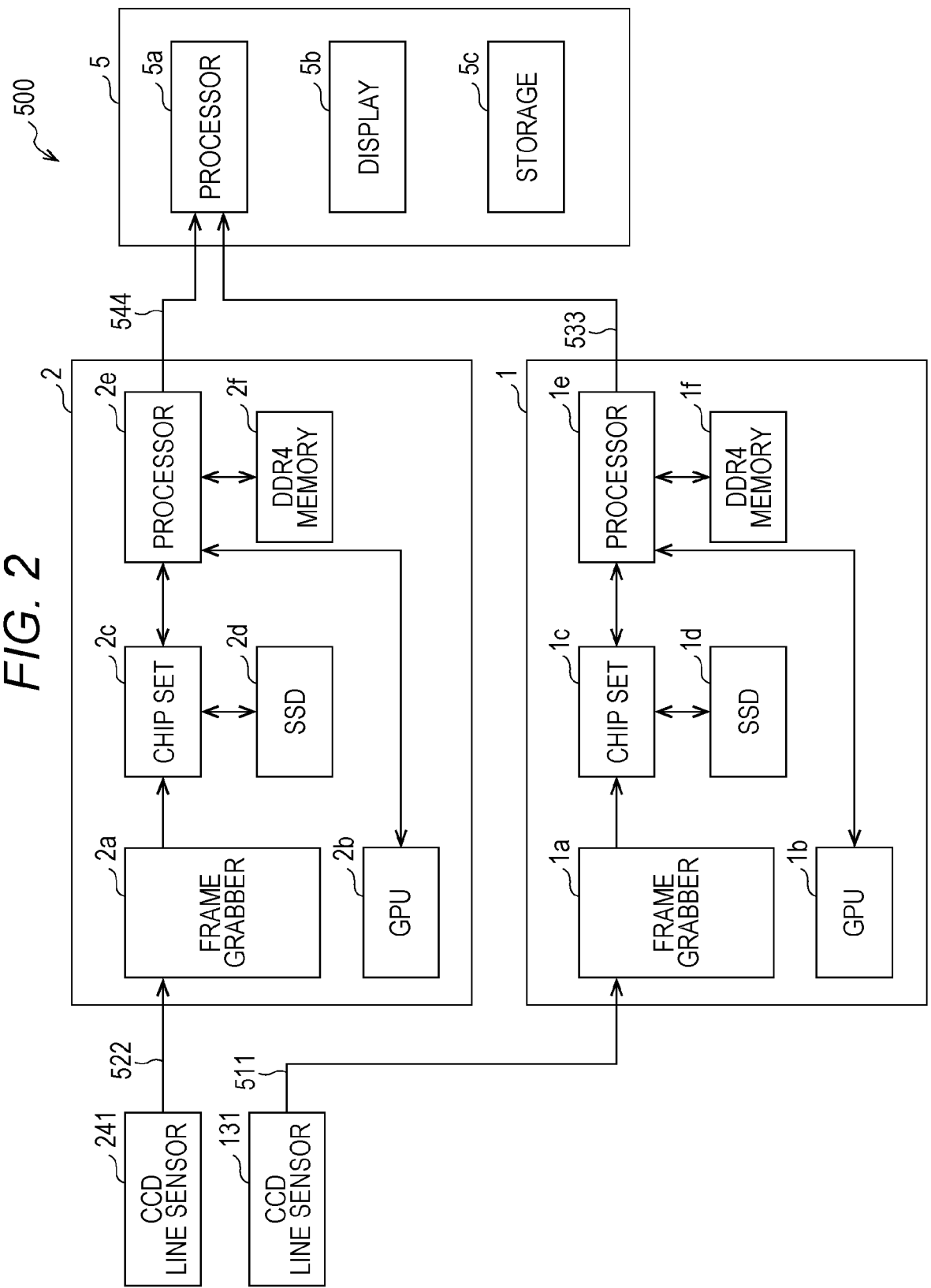
FIG. 2 is a hardware configuration diagram of the image inspection system of the first embodiment.

As illustrated in FIG. 2, the image inspection system 500 of the first embodiment includes the first scanner 3 and the second scanner 4. As the first scanner 3 and the second scanner 4, charge coupled device (CCD) line sensors 131 and 241 are used, respectively. In addition, in the image inspection system 500 of the first embodiment, a frame grabber 1*a*, a graphics processing unit (GPU) 1*b*, a chip set 1*c*, a solid state drive (SSD) 1*d*, a processor (i.e., a first processor) 1*e*, and a double data rate 4 (DDR4) memory 1*f* are used as a hardware configuration of the computer 1.

The frame grabber 1*a* is a dedicated assembly board having an image data input function. The frame grabber 1*a* acquires image data from the CCD line sensor 131 via the bus 511.

The GPU 1*b* is a processor that performs calculation processing necessary for image depiction. The GPU 1*b* is in charge of an instruction related to image processing among instructions executed by the processor 1*e*.

The chip set 1*c* is an IC chip that assists the processor 1*e* and controls data transmission between apparatuses and devices. The chip set 1*c* inputs output from the frame grabber 1*a* to the processor 1*e*.

The SSD 1*d* is an auxiliary storage device that handles a semiconductor memory like a disk drive. The SSD 1*d* stores a predetermined program (including an image inspection program) executed by the processor 1*e*.

The processor 1*e* is a central processing unit (CPU), and executes an instruction set described in a predetermined program. As a result, the processor 1*e* can implement each function according to the first embodiment. The processor 1*e* is a central processing unit of the computer 1, and executes a control program to implement functional units such as a first inspector 13 and a first generator 14 described later.

The DDR4 memory if is a semiconductor memory capable of reading and writing. The DDR4 memory if is a work area of the processor 1*e*.

In addition, in the image inspection system 500 of the first embodiment, a frame grabber 2*a*, a GPU 2*b*, a chip set 2*c*, an SSD 2*d*, a processor (i.e., a second processor) 2*e*, and a DDR4 memory 2*f* are used as a hardware configuration of the computer 2. The frame grabber 2*a*, the GPU 2*b*, the chip set 2*c*, the SSD 2*d*, the processor 2*e*, and the DDR4 memory 2*f* are the same as the frame grabber 1*a*, the GPU 1*b*, the chip set 1*c*, the SSD 1*d*, the processor 1*e*, and the DDR4 memory 1*f*, respectively, and description thereof is omitted.

The frame grabber 2*a* acquires image data from the CCD line sensor 241 via the bus 522. The processors 1*e* and 2*e* are connected to the computer 5 via the buses 533 and 544, respectively. The processor 2*e* is a central processing unit (CPU) of the computer 2, and executes a control program to implement functional units such as a second inspector 23, a second generator 24, a first mirror processor 25, a second mirror processor 26, and a third mirror processor 20 described later.

The computer 5 includes a processor (i.e., a third processor) 5*a*, a display 5*b*, a storage 5*c*, and the like. The processor 5*e* is a central processing unit (CPU), and executes an instruction set described in a predetermined program. As a result, the processor 5*e* can implement each function according to the first embodiment. The processor 5*e* is a central processing unit of the computer 5, and executes an image inspection program to implement functional units such as a report generator 51 and an inspection result file generator 52 described later.

The display 5*b* is constituted by, for example, a liquid crystal display (LCD). The display 5*b* displays an inspection result file inspected by the computer 1 or 2. Note that the inspection result file is displayed not only on the computer 5, and may be displayed on any computer and viewed by a predetermined user.

The storage 5*c* is a large-capacity storage device, and is constituted by, for example, a hard disk drive or a nonvolatile memory. The storage 120 stores, for example, an image inspection program, an inspection image, or a report.

<Functional Configuration>

Figure 3:
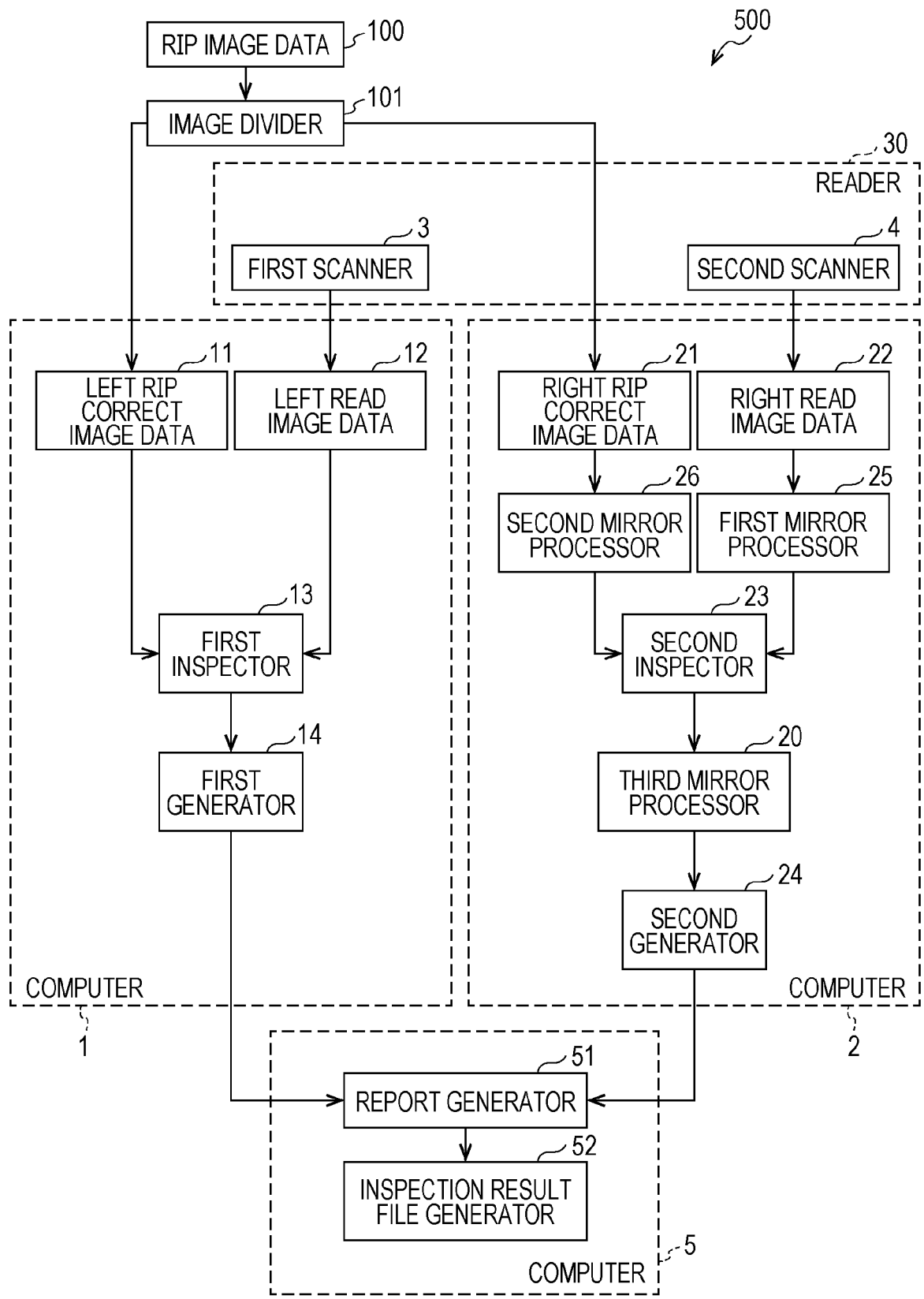
FIG. 3 is a functional block diagram illustrating functions of the image inspection system of the first embodiment.

FIG. 3 is a functional block diagram illustrating functions of the image inspection system 500 of the first embodiment. Raster image processor (RIP) image data 100 is stored in the printer 6 or a control device of the printer 6. As illustrated in FIG. 3, the RIP image data 100 is image data in a bitmap format that can be printed by the printer 6 (image forming data used for image formation), and is, for example, a set of pixels indicated by CMYK values.

An image divider 101 is included in, for example, the printer 6 or a control device (not illustrated) of the printer 6. The control device of the printer 6 may comprise a central processing unit (CPU), and the image divider 101 may be implemented as functions of the control device or the CPU. The image divider 101 divides the RIP image data 100 used for printing by the printer 6 into left RIP correct image data 11 and right RIP correct image data 21 at a predetermined position in the main scanning direction. Then, the image divider 101 sends the left RIP correct image data 11 to the computer 1 and sends the right RIP correct image data 21 to the computer 2.

The reader 30 reads an image formed on the printed matter 200 (recording medium). The reader 30 of the first embodiment includes the first scanner 3 and the second scanner 4 arranged at different positions in the main scanning direction of the printed matter 200. The reader 30 may comprise a central processing unit (CPU) that controls the functions of the first scanner 3 and the second scanner 4 and/or may be connected to another device such as the computers 1, 2, 5 and the printer 6 and controlled by the CPU of the other device.

The computer 1 of the first embodiment stores the left RIP correct image data 11 divided by the image divider 101 and left read image data 12 (first read image) acquired from the first scanner 3. The computer 1 includes the first inspector 13 and the first generator 14.

The left RIP correct image data 11 is a left half of the RIP image data 100 used for image formation. The computer 1 receives the left RIP correct image data 11 divided by the image divider 101 from the image divider 101 and stores the left RIP correct image data 11.

The left read image data 12 (first read image) is obtained by the first scanner 3 scanning a left half of the printed matter 200. The left read image data 12 includes one of divisions obtained by dividing the image formed on the printed matter 200 at a predetermined position in the main scanning direction. Here, the predetermined position in the main scanning direction is any position where a scanning area by the first scanner 3 and a scanning area by the second scanner 4 overlap with each other, and is, for example, a center in a width direction of a printing area of the printed matter 200. The predetermined position in the main scanning direction is also a position obtained by projecting a position at which the image divider 101 divided the RIP image data 100 used for printing by the printer 6 onto a printing area of the printed matter 200.

The first inspector 13 inspects the left read image data 12. Specifically, the first inspector 13 recognizes a left end of the printed matter 200 on the left side of the left read image data 12, and thus recognizes an image area of the printed matter 200. Then, the first inspector 13 compares the left RIP correct image data 11 with an image area of the left read image data 12, and detects an image defect of the left read image data 12. For example, the first inspector 13 determines whether or not a difference between a C (cyan) M (magenta) Y (yellow) K (black) value of a pixel at a predetermined position in the left read image data 12 and a CMYK value of a pixel at a corresponding position in the left RIP correct image data 11 falls within a predetermined range.

In a case where the difference in CMYK value between the predetermined position in the left RIP correct image data 11 and the corresponding position in the left read image data 12 deviates from the predetermined range, the first inspector 13 determines that there is an image defect at the corresponding position of the left read image data 12.

The first generator 14 generates first inspection image data (inspection image) related to the left read image data 12 (first read image) based on the inspection result of the first inspector 13.

Meanwhile, the computer 2 of the first embodiment stores the right RIP correct image data 21 divided by the image divider 101 and right read image data 22 (second read image) acquired from the second scanner 4. The computer 2 includes the second inspector 23, the second generator 24, the first mirror processor 25, the second mirror processor 26, and the third mirror processor 20.

The right RIP correct image data 21 is a right half of the RIP image data 100 used for image formation. The computer 2 receives the right RIP correct image data 21 divided by the image divider 101 from the image divider 101 and stores the right RIP correct image data 21.

The right read image data 22 (second read image) is obtained by the second scanner 4 scanning a right half of the printed matter 200. The right read image data 22 includes the other of the divisions obtained by dividing the image formed on the printed matter 200 at the predetermined position in the main scanning direction.

The first mirror processor 25 of the computer 2 mirror-inverts the right read image data 22. The second mirror processor 26 of the computer 2 mirror-inverts the right RIP correct image data 21. As a result, detection processing in the second inspector 23 can be the same as detection processing in the first inspector 13 of the computer 1.

The second inspector 23 inspects the right read image data 22. Specifically, the second inspector 23 recognizes a right end of the printed matter 200 on the left side of the mirror-inverted right read image data 22, and thus recognizes the image area of the printed matter 200. Then, the second inspector 23 compares the mirror-inverted right RIP correct image data 21 with the image area of the mirror-inverted right read image data 22, and detects an image defect of the mirror-inverted right read image data 22. For example, the second inspector 23 determines whether or not a difference between a CMYK value of a pixel at a predetermined position in the mirror-inverted right read image data 22 and a CMYK value of a pixel at a corresponding position in the mirror-inverted right RIP correct image data 21 falls within a predetermined range.

In a case where the difference in CMYK value between the predetermined position of the right RIP correct image data 21 and the corresponding position of the right read image data 22 deviates from the predetermined range, the second inspector 23 determines that there is an image defect at the corresponding position of the right read image data 22.

Then, the third mirror processor 20 mirror-inverts and returns the mirror-inverted second inspection image data to the original position, and changes the coordinates of the inspection data to the mirror-inverted position.

For example, in a case where the right read image data 22 and the right RIP correct image data 21 are not mirror-inverted, the second inspector 23 needs to perform a mirror-inverted operation with respect to an operation of the first inspector 13, and it is necessary to create different detection programs between the second inspector 23 and the first inspector 13. In the first embodiment, since the first mirror processor 25, the second mirror processor 26, and the third mirror processor 20 are disposed, an inspection program of the first inspector 13 and an inspection program of the second inspector 23 can be the same.

Note that the first mirror processor 25, the second mirror processor 26, and the third mirror processor 20 are disposed in the computer 2, but may be disposed in the computer 1. The first mirror processor 25, the second mirror processor 26, and the third mirror processor 20 are optional components, and an operation of the second inspector 23 may be mirror-inversion with respect to an operation of the first inspector 13.

The second generator 24 generates second inspection image data (inspection image) related to the right read image data 22 (second read image) based on the inspection result of the second inspector 23.

The first generator 14 of the computer 1 and the second generator 24 of the computer 2 may add information on the order of the first inspection image data and the second inspection image data to the first inspection image data and the second inspection image data, respectively. In this case, the first generator 14 of the computer 1 and the second generator 24 of the computer 2 add information on the order to the first inspection image data and the second inspection image data, respectively such that the first inspection image data and the second inspection image data are continuous. The report generator 51 alternately arranges the first inspection image data and the second inspection image data in a report.

Furthermore, the first generator 14 of the computer 1 and the second generator 24 of the computer 2 may add information on the order to the first inspection image data and the second inspection image data, respectively such that the first inspection image data and the second inspection image data are alternately continuous. At this time, the report generator 51 arranges the first inspection image data and the second inspection image data in a report based on the order information added to the first inspection image data and the second inspection image data.

In addition, the first generator 14 of the computer 1 and the second generator 24 of the computer 2 can transmit pieces of the generated first inspection image data and pieces of the generated second inspection image data one by one, respectively. At this time, the first generator 14 and the second generator 24 may alternately transmit pieces of the first inspection image data and pieces of the second inspection image data one by one, respectively. The report generator 51 arranges the first inspection image data and the second inspection image data in a report in the order of reception.

In addition, the first generator 14 of the computer 1 and the second generator 24 of the computer 2 may collectively transmit a plurality of pieces of the first inspection image data and a plurality of pieces of the second inspection image data, respectively.

In addition, the first generator 14 of the computer 1 and the second generator 24 of the computer 2 may add information on the reader 30 (the first scanner 3 and the second scanner 4) that has read the left read image data 12 or the right read image data 22 to the first inspection image data and/or the second inspection image data. In a case where either the left read image data 12 or the right read image data 22 includes an abnormality, the first generator 14 of the computer 1 and the second generator 24 of the computer 2 may generate another inspection image data.

Note that the first inspection image data and the second inspection image data may include inspection results for the left read image data 12 and the right read image data 22, respectively. The inspection results include, for example, noise information and level information.

Meanwhile, the computer 5 of the first embodiment includes the report generator 51 and the inspection result file generator 52 described above.

The report generator 51 alternately allocates (arranges) the first inspection image data and the second inspection image data in units of pages to generate a report (report data).

The inspection result file generator 52 generates a file in a format such as a portable document format (PDF) from the report data in which the first inspection image data and the second inspection image data are alternately allocated in units of pages. In this case, for example, the first inspection image data and the second inspection image data constituting the report data are in a JPEG format. The inspection result file generator 52 integrates the plurality of pieces of first inspection image data and the plurality of pieces of second inspection image data into one PDF in the order of file names.

<Report Function>

Figure 4:
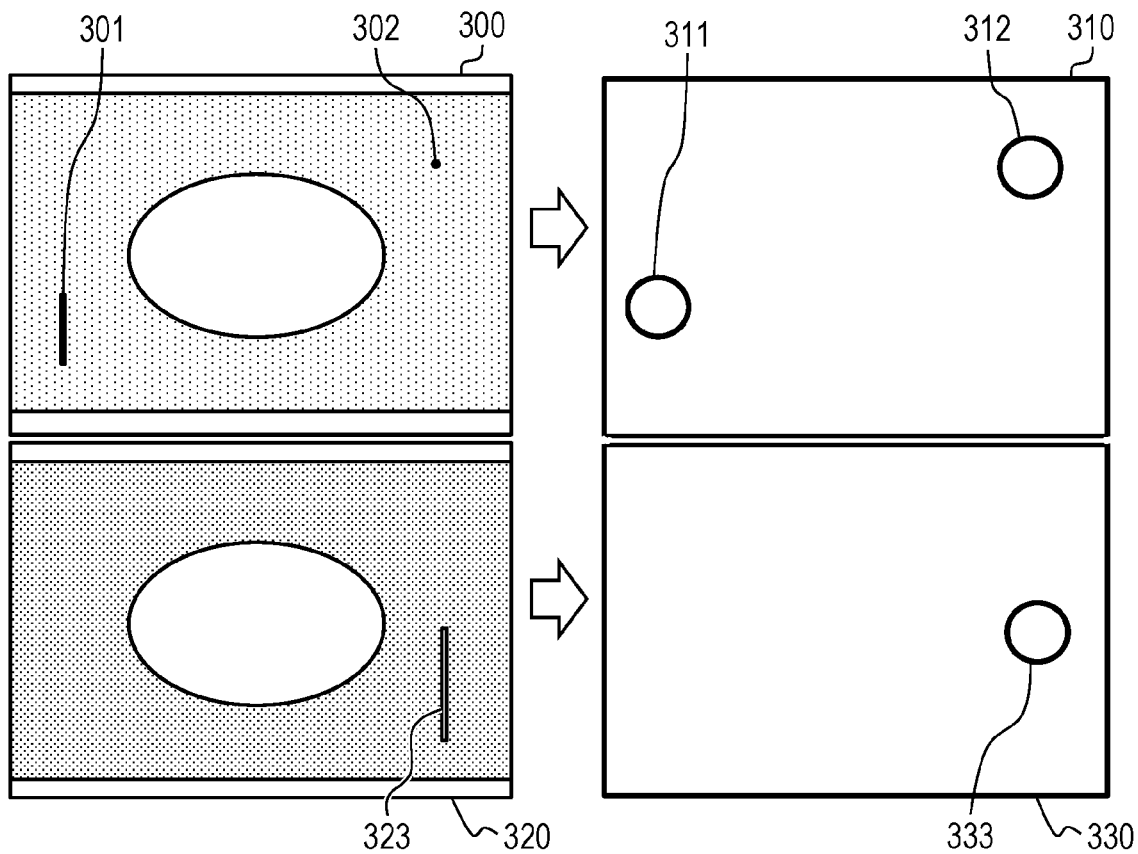
FIG. 4 is a diagram illustrating a report including a result bookmark hierarchy.

FIG. 4 is an explanatory diagram illustrating a concept of a report including a result bookmark hierarchy.

Each of images 300 and 320 illustrated in FIG. 4 is an image obtained by reading the printed matter 200 in units of pages.

The image 300 includes an abnormality 301 and an abnormality 302. The abnormality 301 indicates a black streak, and the abnormality 302 indicates dirt. In addition, the image 320 includes an abnormality 323. The abnormality 323 indicates a white streak.

Inspection result data 310 is text data in which coordinates of an abnormal portion of the image 300 are described. Here, coordinates 311 of the abnormality 301 and coordinates 312 of the abnormality 302 are described. Inspection result data 330 is text data in which coordinates of an abnormal portion of the image 320 are described. Here, coordinates 333 of the abnormality 323 are described.

Figure 5:
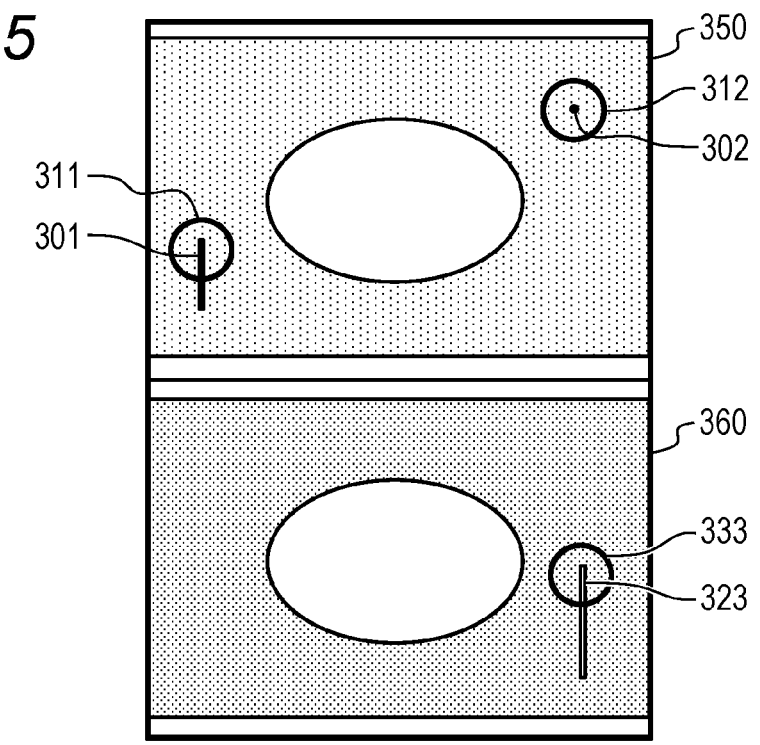
FIG. 5 is a diagram illustrating a display example of an inspection result file including a result bookmark hierarchy.

FIG. 5 is a diagram illustrating a display example of an inspection result file including a result bookmark hierarchy.

The inspection result file includes the inspection images illustrated in FIG. 4 and a result bookmark hierarchy superimposed on the inspection images. Information such as coordinates of an abnormal portion and the type of abnormality is stored in the result bookmark hierarchy.

As illustrated in FIG. 5, a PDF viewer displays a title or a balloon indicating the abnormality 301 at coordinates 311 and a title or a balloon indicating the abnormality 302 at coordinates 312 while the titles and the balloons are superimposed on the image 350. Similarly, the PDF viewer displays a title or a balloon indicating the abnormality 323 at coordinates 333 while the title and the balloon are superimposed on the image 360.

In this case, as illustrated in FIG. 5, the report generator 51 allocates the inspection image data in a JPEG format and the inspection result data storing information such as the coordinates of an abnormal portion and the type of abnormality. The inspection result file generator 52 generates an inspection result file in which the coordinates of an abnormal portion, the type of abnormality, and the like are allocated to the result bookmark hierarchy, for example, in a PDF format while the inspection result file is superimposed on the inspection image data in a JPEG format. As a result, the PDF viewer can display a title or a balloon corresponding to the coordinates of the abnormal portion while the title and the balloon are superimposed on the inspection image. Note that the format of the inspection result file is not limited to PDF. The viewer is not limited to the PDF viewer.

Comparative Example 1

Here, as a comparative example, a display example of an inspection result file obtained by combining conventional inspection images will be described. Note that the same components are denoted by the same reference numerals, and description thereof is omitted appropriately.

Figure 6:
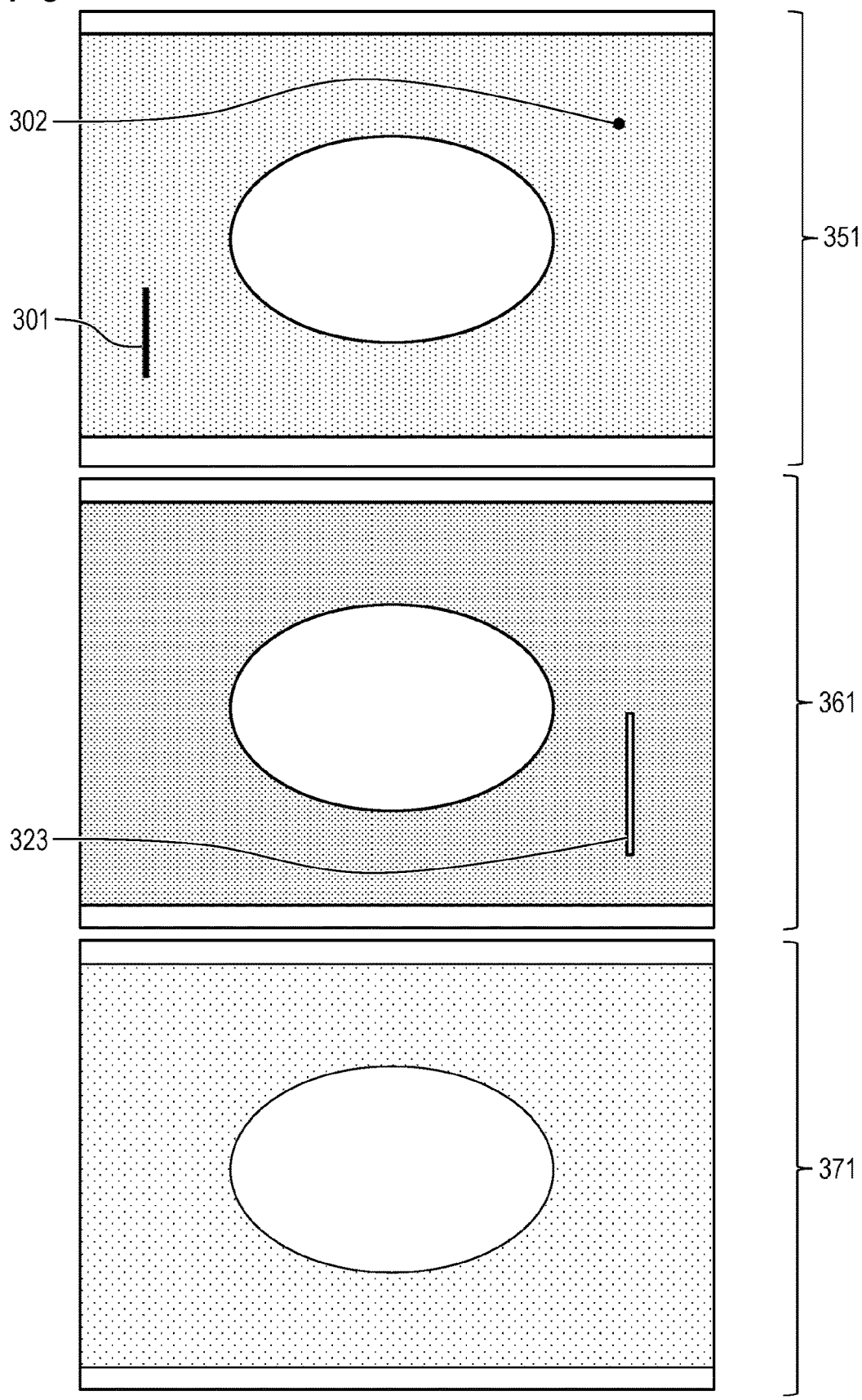
FIG. 6 is a diagram illustrating an inspection result file obtained by combining inspection images.
Figure 7:
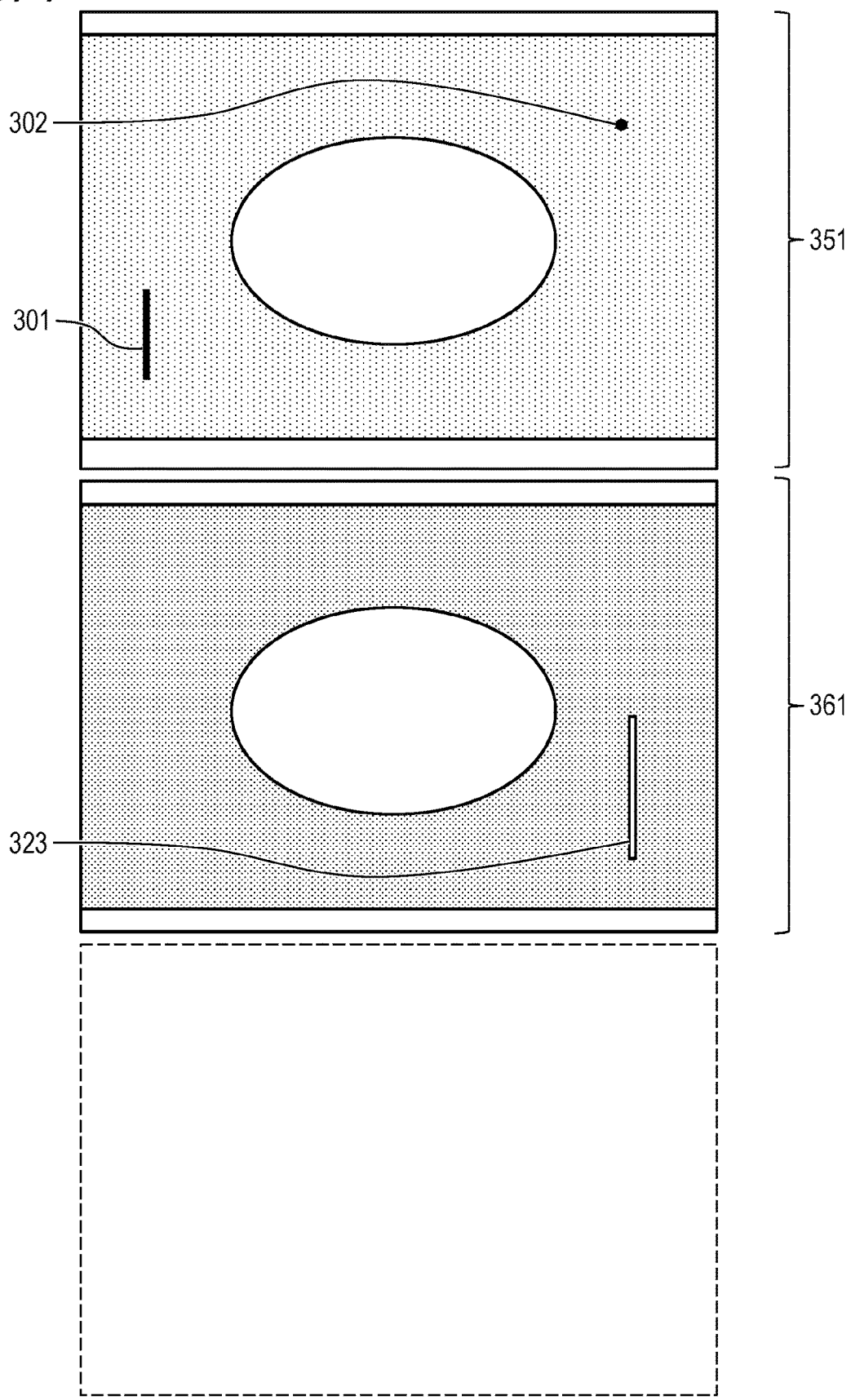
FIG. 7 is a diagram illustrating an inspection result file obtained by combining inspection images only for an abnormal image in a read image.

FIG. 6 is an explanatory diagram illustrating an inspection result file obtained by combining inspection images. FIG. 7 is an explanatory diagram illustrating an inspection result file obtained by combining inspection images only for an abnormal image in a read image. Each of FIGS. 6 and 7 illustrates an inspection result file obtained by combining inspection images.

As illustrated in FIG. 6, an image 351 includes the abnormality 301 indicating a black streak and the abnormality 302 indicating dirt. Meanwhile, an image 361 includes the abnormality 323 indicating a white streak. Meanwhile, no abnormality is detected in an image 371.

As illustrated in FIG. 7, the image 351 and the image 361 are the same as those in FIG. 6. However, since no abnormality is detected in the image 371 in FIG. 6, the inspection result file illustrated in FIG. 7 does not include the image 371 in which no abnormality is detected.

Comparative Example 2

Figure 8A:
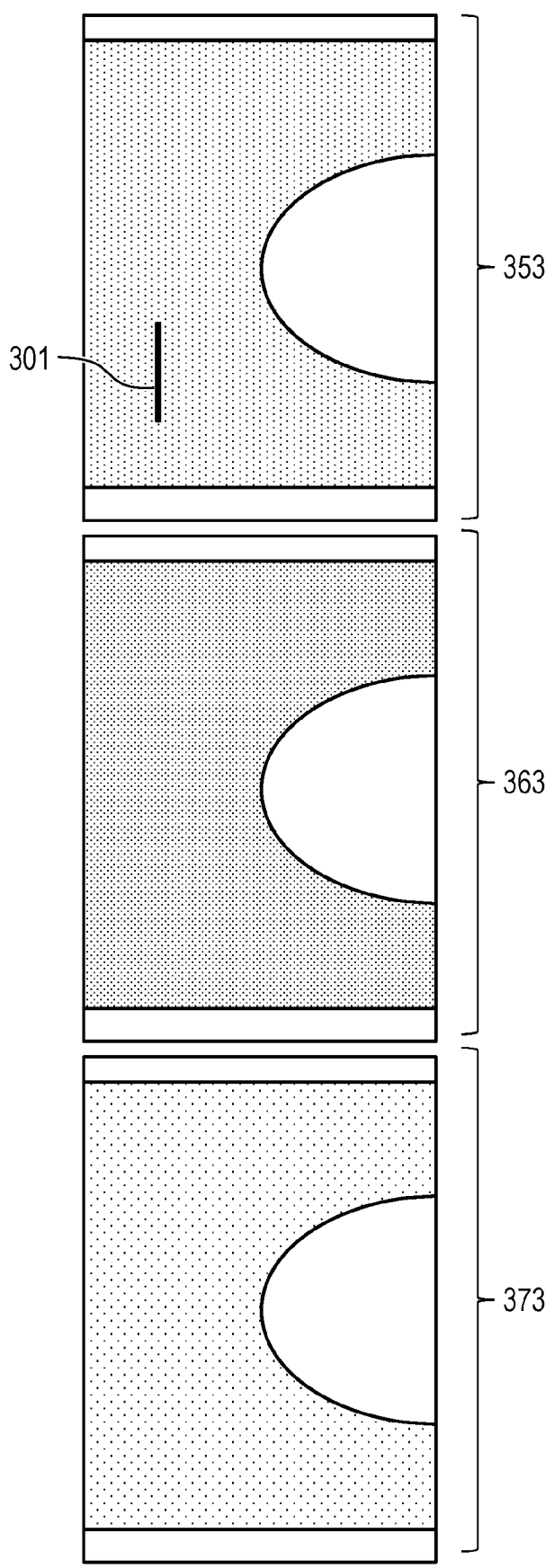
FIG. 8A is a diagram illustrating an inspection result file in which an inspection image is kept divided (part 1)
Figure 8B:
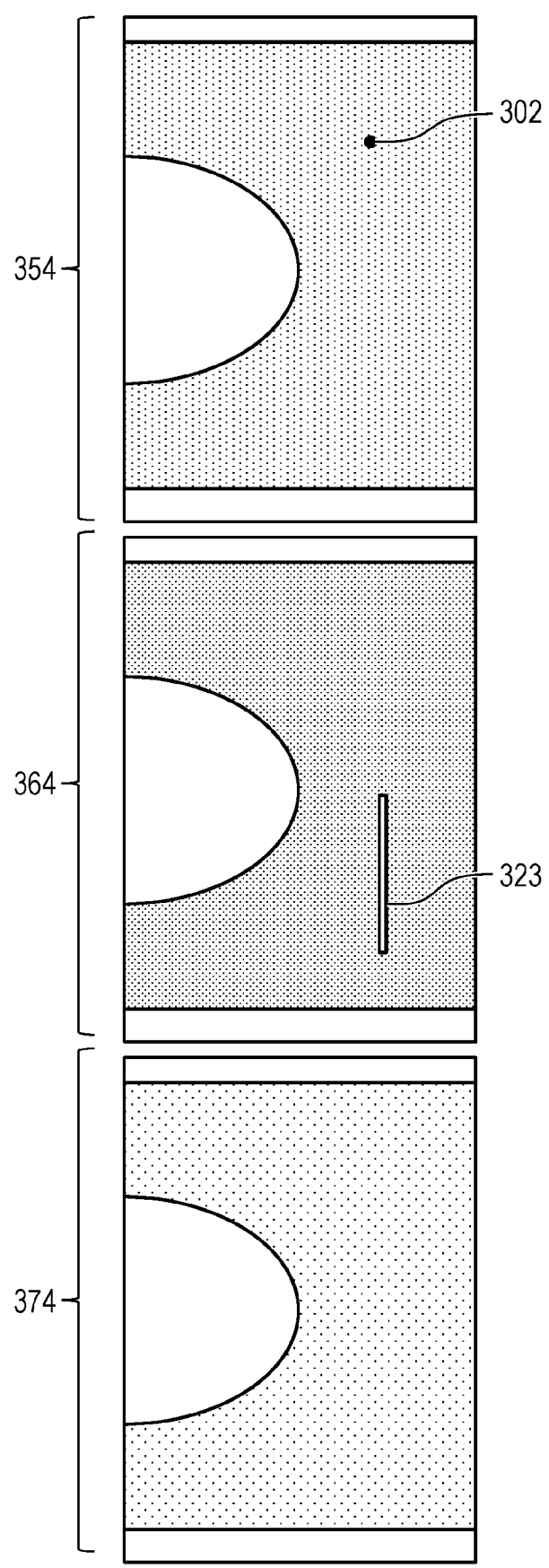
FIG. 8B is a diagram illustrating an inspection result file in which an inspection image is kept divided (part 2)
Figure 9A:
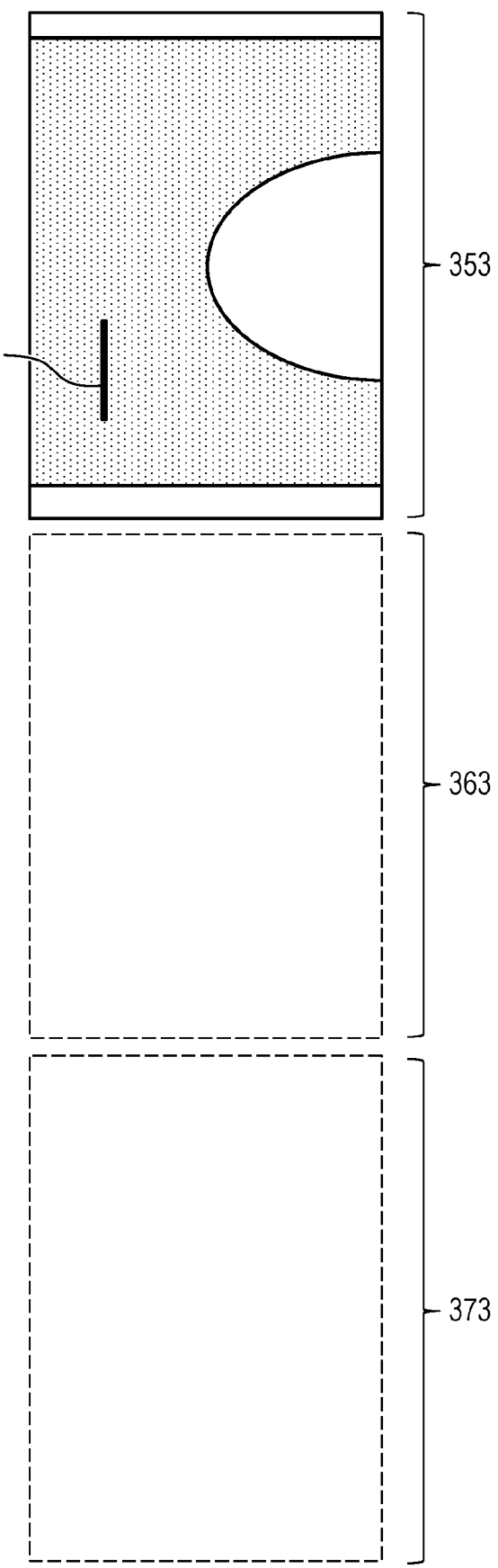
FIG. 9A is a diagram illustrating an inspection result file in which an inspection image is kept divided only for an abnormal image in a read image (part 1)
Figure 9B:
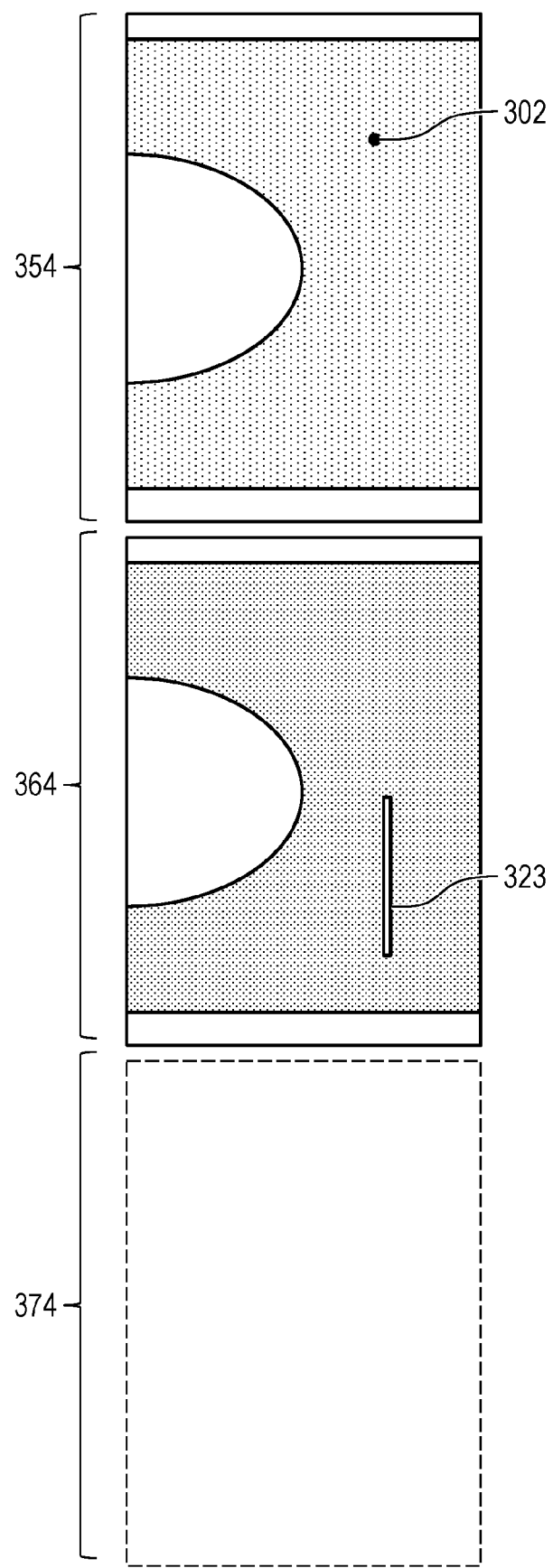
FIG. 9B is a diagram illustrating an inspection result file in which an inspection image is kept divided only for an abnormal image in a read image (part 2)

FIGS. 8A and 8B are each a diagram illustrating an inspection result file in which an inspection image is kept divided. FIGS. 9A and 9B are each a diagram illustrating an inspection result file in which an inspection image is kept divided only for an abnormal image in a read image.

As illustrated in FIG. 8A, an image 353 includes the abnormality 301 indicating a black streak. No abnormality is detected in an image 363. No abnormality is detected in an image 373. Since each of the images 353, 363, and 373 is a left half of one page, it is difficult to grasp the image quality and the like of the entire page of the printed matter 200.

As illustrated in FIG. 8B, an image 354 includes the abnormality 302 indicating dirt. Meanwhile, an image 364 includes the abnormality 323 indicating a white streak. Meanwhile, no abnormality is detected in an image 374. Since each of the images 354, 364, and 374 is a right half of one page, it is difficult to grasp the image quality and the like of the entire page of the printed matter 200.

As illustrated in FIG. 9A, the image 353 is the same as that in FIG. 8A. However, since no abnormality is detected in the image 363 and the image 373 in FIG. 8A, the inspection result file illustrated in FIG. 9A does not include the image 363 and the image 373 in which no abnormality is detected. Therefore, in this inspection result file, the image quality of the entire page of the printed matter 200 constituted by the images 363 and 364 or the images 373 and 374 cannot be grasped.

As illustrated in FIG. 9B, the image 354 and the image 364 are the same as those in FIG. 8B. However, since no abnormality is detected in the image 374 in FIG. 8B, the inspection result file illustrated in FIG. 9B does not include the image 374. Therefore, in this inspection result file, the image quality of the entire page of the printed matter 200 constituted by the images 373 and 374 cannot be grasped.

Figure 10A:
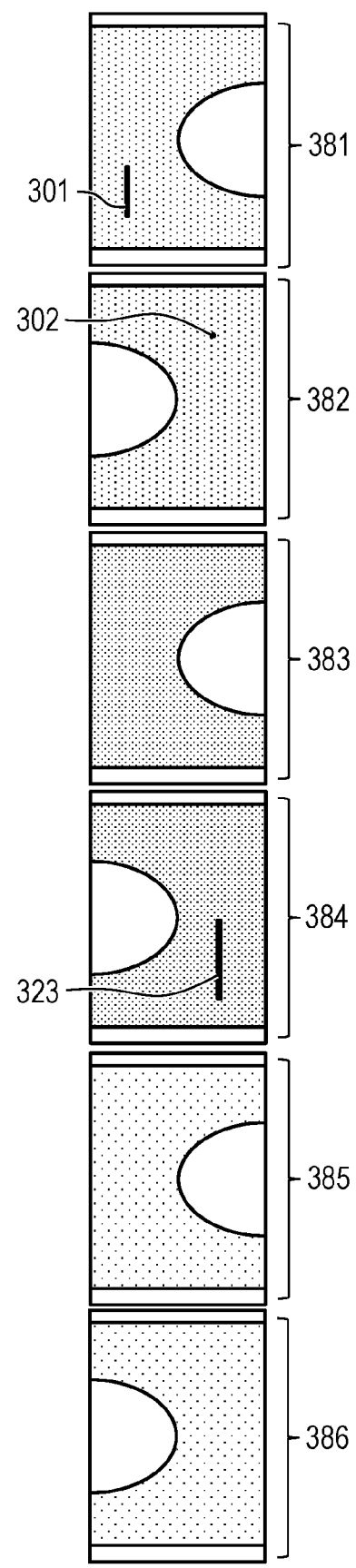
FIG. 10A is a diagram illustrating an inspection result file in which inspection images are alternately arranged while being divided.

FIG. 10A is a diagram illustrating an inspection result file generated by the image inspection system 500.

In the inspection result file illustrated in FIG. 10A, the first inspection image data and the second inspection image data are arranged so as to be alternately continuous. Specifically, an image 381 of the first inspection image data including the page left side of a first printed matter 200 is arranged on a first page of the inspection result file. An image 382 of the second inspection image data including the page right side of the first printed matter 200 is arranged on a second page of the inspection result file.

An image 383 of the first inspection image data including the page left side of a second printed matter 200 is arranged on a third page of the inspection result file. An image 384 of the second inspection image data including the page right side of the second printed matter 200 is arranged on a fourth page of the inspection result file.

An image 385 of the first inspection image data including the page left side of a third printed matter 200 is arranged on a fifth page of the inspection result file. An image 386 of the second inspection image data including the page right side of the third printed matter 200 is arranged on a sixth page of the inspection result file.

Returning to FIG. 3, the description will be continued. The first generator 14 adds information such that each of the images 381, 383, and 385 is arranged on the left side of an inspection image. For example, the first generator 14 assigns an odd number starting from 1 to a file name or a data name on the left side of a page of each printed matter 200.

Meanwhile, the second generator 24 of the computer 2 adds information on the order to the images 382, 384, and 386 which are the second inspection image data such that the first inspection image data and the second inspection image data are alternately continuous. Specifically, the second generator 24 adds information such that each of the images 382, 384, and 386 is arranged on the right side of an inspection image. For example, the second generator 24 assigns an even number starting from 2 to a file name or a data name on the right side of a page of each printed matter 200.

As a result, the report generator 51 generates a report in which the left side of an image formed on each sheet is arranged on an odd page, and the right side of the image formed on each sheet is arranged on an even page. Then, the inspection result file generator 52 generates an inspection result file from the report. As a result, the inspection result file is displayed by a PDF viewer such that each page of the first inspection image data and each page of the second inspection image data are alternately continuous.

Here, in the inspection result file illustrated in FIG. 10A, the image 381 includes the abnormality 301 indicating a black streak. The image 382 includes the abnormality 302 indicating dirt.

No abnormality is detected in the image 383. The image 384 includes the abnormality 323 indicating a white streak. No abnormality is detected in the images 385 and 386.

Returning to FIG. 3, the description will be continued. The report generator 51 of the computer 5 acquires the first inspection image data and the second inspection image data and generates a report (report data) in which the first inspection image data and the second inspection image data are alternately allocated (arranged). The inspection result file generator 52 generates an inspection result file, for example, in a PDF format from this report data. For example, when viewing the inspection result file, a user uses a double-page spread display function of a PDF viewer.

Figure 10B:
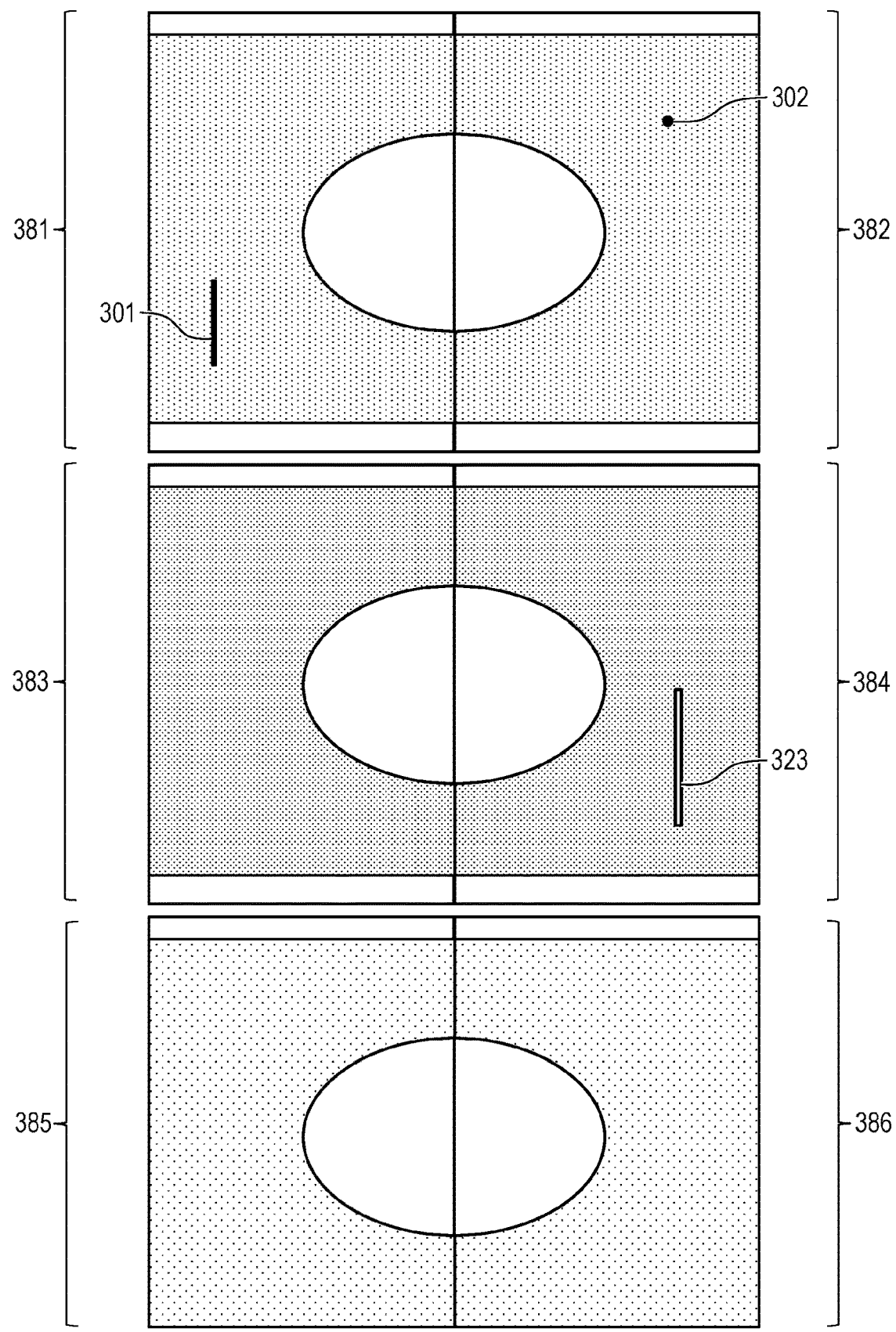
FIG. 10B is a screen example obtained by displaying an inspection result file in which inspection images are alternately arranged while being divided in a double-page spread manner.

FIG. 10B is a diagram illustrating an example in which an inspection result file is viewed in a double-page spread manner.

A PDF viewer displays the inspection result file illustrated in FIG. 10A in a double-page spread manner. The PDF viewer may display the first inspection image data and the second inspection image data in a double-page spread manner correspondingly to arrangement of the first read image and the second read image. That is, the PDF viewer displays a first page and a second page of the inspection result file in a double-page spread manner, thereby displaying the image 381 of the first inspection image data including the page left side of a first printed matter 200 and the image 382 of the second inspection image data including the page right side of the first printed matter 200 in a double-page spread manner.

In this case, the image 381 belonging to the first inspection image data is arranged on the first page of the inspection result file, and is therefore displayed on the left side in a double-page spread manner by the PDF viewer. Meanwhile, the image 382 belonging to the second inspection image data is arranged on the second page of the inspection result file, and is therefore displayed on the right side in a double-page spread manner by the PDF viewer.

The PDF viewer displays a third page and a fourth page of the inspection result file in a double-page spread manner, thereby displaying the image 383 of the first inspection image data including the page left side of a second printed matter 200 and the image 384 of the second inspection image data including the page right side of the second printed matter 200 in a double-page spread manner.

In this case, the image 383 belonging to the first inspection image data is arranged on the third page of the inspection result file, and is therefore displayed on the left side in a double-page spread manner by the PDF viewer. Meanwhile, the image 384 belonging to the second inspection image data is arranged on the fourth page of the inspection result file, and is therefore displayed on the right side in a double-page spread manner by the PDF viewer.

Then, the PDF viewer displays a fifth page and a sixth page of the inspection result file in a double-page spread manner, thereby displaying the image 385 of the first inspection image data including the page left side of a third printed matter 200 and the image 386 of the second inspection image data including the page right side of the third printed matter 200 in a double-page spread manner.

In this case, the image 385 belonging to the first inspection image data is arranged on the fifth page of the inspection result file, and is therefore displayed on the left side in a double-page spread manner by the PDF viewer. Meanwhile, the image 386 belonging to the second inspection image data is arranged on the sixth page of the inspection result file, and is therefore displayed on the right side in a double-page spread manner by the PDF viewer.

In this manner, the report generator 51 can generate and alternately arrange the first inspection image data and the second inspection image data in units of one page.

Note that the first inspection image data and the second inspection image data may include inspection results for the left read image data 12 (first read image) and the right read image data 22 (second read image), respectively. The inspection results include, for example, noise information and level information.

In addition, the first generator 14 and the second generator 24 may add information on the reader that has read the left read image data 12 or the right read image data 22 to the first inspection image data and/or the second inspection image data. For example, the first generator 14 adds information of the first scanner 3 of the reader 30 to the first inspection image data. The second generator 24 adds information of the second scanner 4 of the reader 30 to the second inspection image data.

In this manner, the report generator 51 of the computer 5 generates a report in which the left side and the right side of an image formed on each sheet are alternately allocated. In the inspection result file generated based on this report, the entire page of the original printed matter can be viewed by a double-page spread display function of a PDF viewer (application for viewing).

As a result, the image inspection system 500 can implement viewing substantially equivalent to a case of combining left and right inspection images and then generating a report. In other words, the image inspection system 500 can allocate each image such that a user can suitably view an inspection image and an inspection result report on the same sheet.

As described above, the image inspection system 500 of the first embodiment includes the first scanner 3, the second scanner 4, the first inspector 13, the second inspector 23, the first generator 14, and the second generator 24.

Each of the first scanner 3 and the second scanner 4 reads an image formed on the printed matter 200. That is, the first scanner 3 reads the left read image data 12 including one of divisions obtained by dividing the image on the printed matter 200 at a predetermined position in the main scanning direction. That is, the second scanner 4 reads the right read image data 22 including the other of the divisions obtained by dividing the image on the printed matter 200 at the predetermined position in the main scanning direction.

The first inspector 13 inspects the left read image data 12 including one of divisions obtained by dividing the image at a predetermined position in the main scanning direction. The second inspector 23 inspects the right read image data 22 including the other of the divisions obtained by dividing the image at the predetermined position in the main scanning direction. The first generator 14 generates the first inspection image data (inspection image) related to the left read image data 12 based on the inspection result of the first inspector 13. The second generator 24 generates the second inspection image data (inspection image) related to the right read image data 22 based on the inspection result of the second inspector 23.

As a result, the image inspection system 500 of the first embodiment can suitably generate an image inspection result in a case where a read image is divided in a sheet width direction, and can further meet the demand for generation of the image inspection result in a case where the read image is divided in the sheet width direction. The demand related to the generation of the image inspection result in a case where the read image is divided in the sheet width direction is, for example, checking the generated image inspection result in units of pages or creating a report of the image inspection result without deteriorating performance of the inspection.

Note that the first generator 14 of the computer 1 and the second generator 24 of the computer 2 can add information on the order of the first inspection image data and the second inspection image data to the first inspection image data and the second inspection image data, respectively.

In this case, the first generator 14 of the computer 1 and the second generator 24 of the computer 2 can add information on the order to the first inspection image data and the second inspection image data, respectively such that the first inspection image data and the second inspection image data are continuous.

Furthermore, the first generator 14 of the computer 1 and the second generator 24 of the computer 2 may add information on the order to the first inspection image data and the second inspection image data, respectively such that the first inspection image data and the second inspection image data are alternately continuous.

In addition, the first generator 14 and the second generator 24 may transmit pieces of the generated first inspection image data and pieces of the generated second inspection image data one by one, respectively. In this case, the first generator 14 and the second generator 24 may alternately transmit pieces of the first inspection image data and pieces of the second inspection image data one by one, respectively.

In addition, the first generator 14 and the second generator 24 may collectively transmit a plurality of pieces of the first inspection image data and a plurality of pieces of the second inspection image data, respectively.

In addition, the first generator 14 and the second generator 24 can generate the first inspection image data and the second inspection image data, respectively in a case where one of the first read image and the second read image includes an abnormality. As a result, the first inspection image data and the second inspection image data can be arranged in a report so as to be displayed in a double-page spread manner all the time by a PDF viewer.

Here, as described above, the report includes an inspection image and an inspection result including an image defect portion and the type of defect. In a case where the report is created based on an analysis result of an inspection image divided into the left side and the right side, the report is generated for each of the left and right inspection images. In this case, the left and right inspection images are originally the inspection image obtained by analyzing an image on the same sheet, but a user views the report in which the image on the same sheet is divided into the left side and the right side. That is, it is difficult for the user to view the entire sheet.

Therefore, in order to make it easy for the user to view the entire sheet, it is conceivable to combine two read images on the left side and the right side on the same sheet and then perform inspection. However, since the area of the image to be analyzed is large, a higher-speed image processor is required.

In addition, in order to make it easy for the user to view the entire sheet, it is also conceivable to combine two inspection images on the left side and the right side to create a report. However, when the report is created during an inspection, there is a concern that performance of the inspection is deteriorated. As a result, another image processor or a higher-speed image processor is required.

Therefore, the image inspection system 500 of the first embodiment assigns each image such that a user can suitably view a report of a result of dividing an image formed on each sheet into two and inspecting the divided images. That is, the image inspection system 500 arranges the first inspection image data and the second inspection image data in the report such that the first inspection image data and the second inspection image data can be displayed in a double-page spread manner by a PDF viewer.

As a result, in a case where an image formed on the printed matter 200 is divided into two and inspected, the image inspection system 500 of the first embodiment can allow a user to suitably view an inspection image and an inspection result report on the same sheet.

Second Embodiment

A report generator 51 of a computer 5 of a second embodiment generates a report such that the report does not include an inspection image in which each of left read image data 12 and right read image data 22 includes no abnormality. As a result, the number of pages and the data size of an inspection result file can be reduced.

The report generator 51 of the second embodiment is different from the report generator 51 of the first embodiment in that two images 385 and 386 including no abnormality are not included in a report unlike FIGS. 10A and 10B of the first embodiment.

Figure 11A:
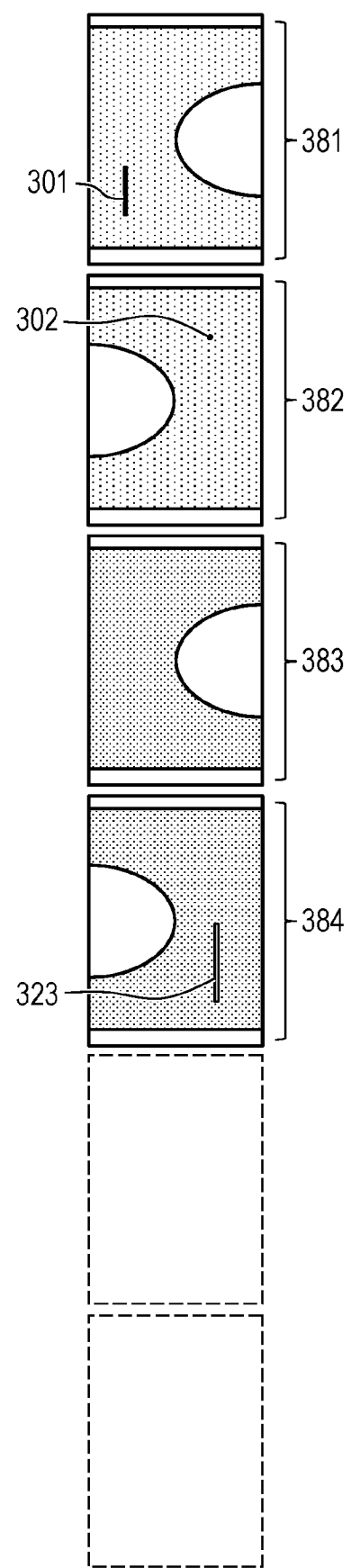
FIG. 11A is a diagram illustrating an inspection result file in which two images including no abnormality are not included and inspection images are alternately arranged while being divided, unlike FIG. 10A.

FIG. 11A is a diagram illustrating an inspection result file generated by the image inspection system 500. The inspection result file of FIG. 11A includes images 381 to 384 similarly to the inspection result file of FIG. 10A, but does not include images 385 and 386 constituting a page of a third printed matter 200 including no abnormality. The image 383 includes no abnormality, but a second printed matter 200 includes an abnormality 323. Therefore, the inspection result file includes the images 383 and 384 in order to display the entire page of the second printed matter 200 in a double-page spread manner.

Figure 11B:
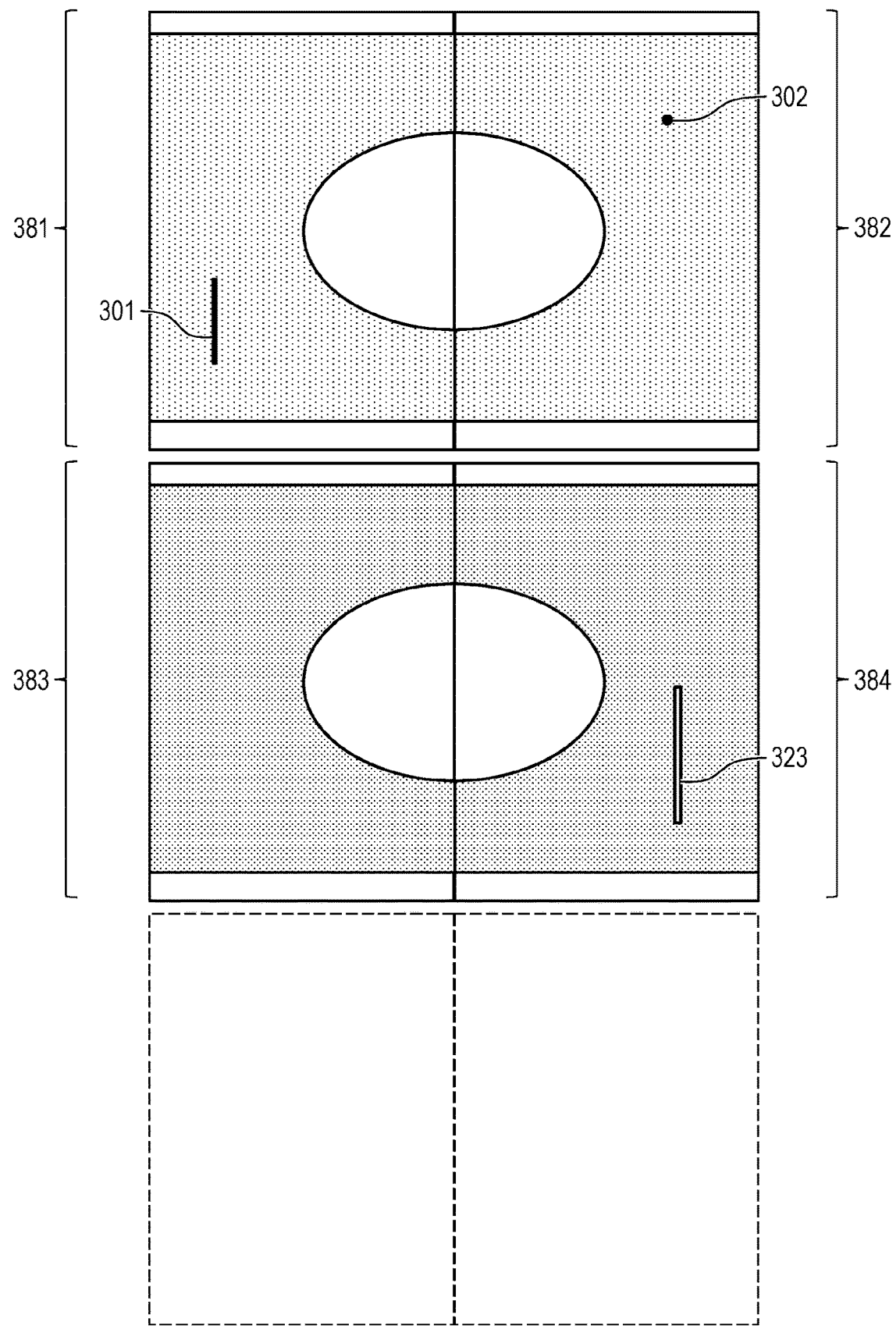
FIG. 11B is a diagram illustrating an inspection result file in which two images including no abnormality are not included and inspection images are alternately arranged while being divided, unlike FIG. 10B.

FIG. 11B is a diagram illustrating an example in which the inspection result file of FIG. 11A is viewed in a double-page spread manner. A PDF viewer displays the inspection result file illustrated in FIG. 11A in a double-page spread manner. The PDF viewer displays a first page and a second page of the inspection result file in a double-page spread manner, thereby displaying the image 381 of the first inspection image data including the page left side of a first printed matter 200 and the image 382 of the second inspection image data including the page right side of the first printed matter 200 in a double-page spread manner. As a result, a user can grasp the state of the entire page of the first printed matter 200 and grasp that the abnormalities 301 and 302 exist.

In addition, the PDF viewer displays a third page and a fourth page of the inspection result file in a double-page spread manner, thereby displaying the image 383 of the first inspection image data including the page left side of a second printed matter 200 and the image 384 of the second inspection image data including the page right side of the second printed matter 200 in a double-page spread manner. As a result, a user can grasp the state of the entire page of the second printed matter 200 and grasp that the abnormality 323 exists.

In addition, the inspection result file does not include the two images 385 and 386 each including no abnormality. As a result, by excluding, for example, inspection image data including no abnormality of the printed matter 200 from the inspection result file, the inspection result file can reduce the file size of the inspection result file. Furthermore, in a case where each of an inspection image on the left side and an inspection image on the right side on the printed matter 200 includes no abnormality, inspection image data of the printed matter 200 is excluded from the inspection result file. As a result, a user can view a combination of an odd page and an even page of the inspection result file in a double-page spread manner in association with any of the printed matters 200.

Third Embodiment

Figure 12A:
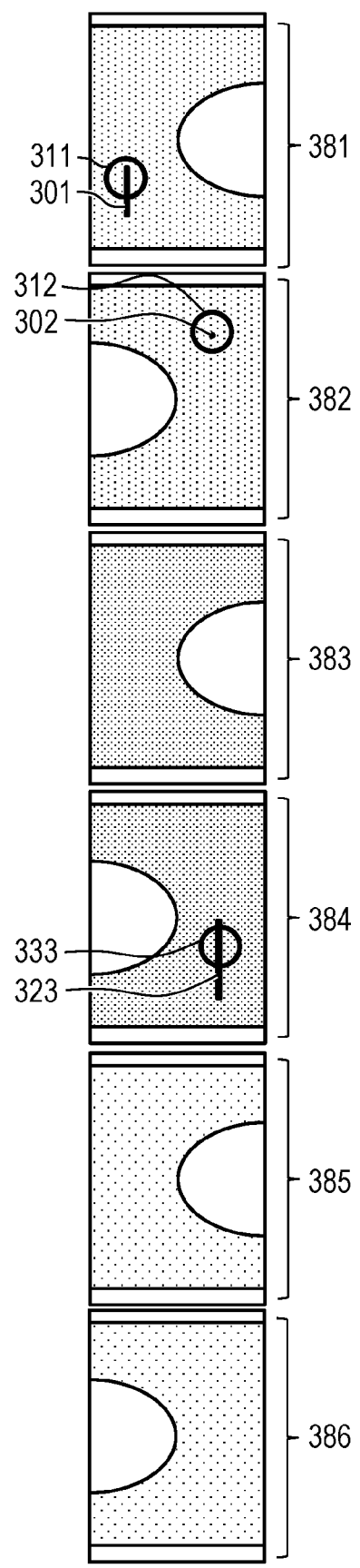
FIG. 12A is a diagram illustrating an inspection result file in which inspection images are alternately arranged while being divided and to which a result bookmark hierarchy is added.

An inspection result file of a third embodiment illustrated in FIG. 12A is obtained by combining inspection result data corresponding to images 381 to 386 (text data in which the coordinates of an abnormal portion are described) with the inspection result file of the first embodiment illustrated in FIG. 10A. As a result, a result bookmark hierarchy of the inspection result file can include coordinates 311 of an abnormality 301, coordinates 312 of an abnormality 302, and coordinates 333 of an abnormality 323.

By combining the inspection result data with the result bookmark hierarchy of the inspection result file, a PDF viewer can display a title or a balloon indicating an abnormality.

Figure 12B:
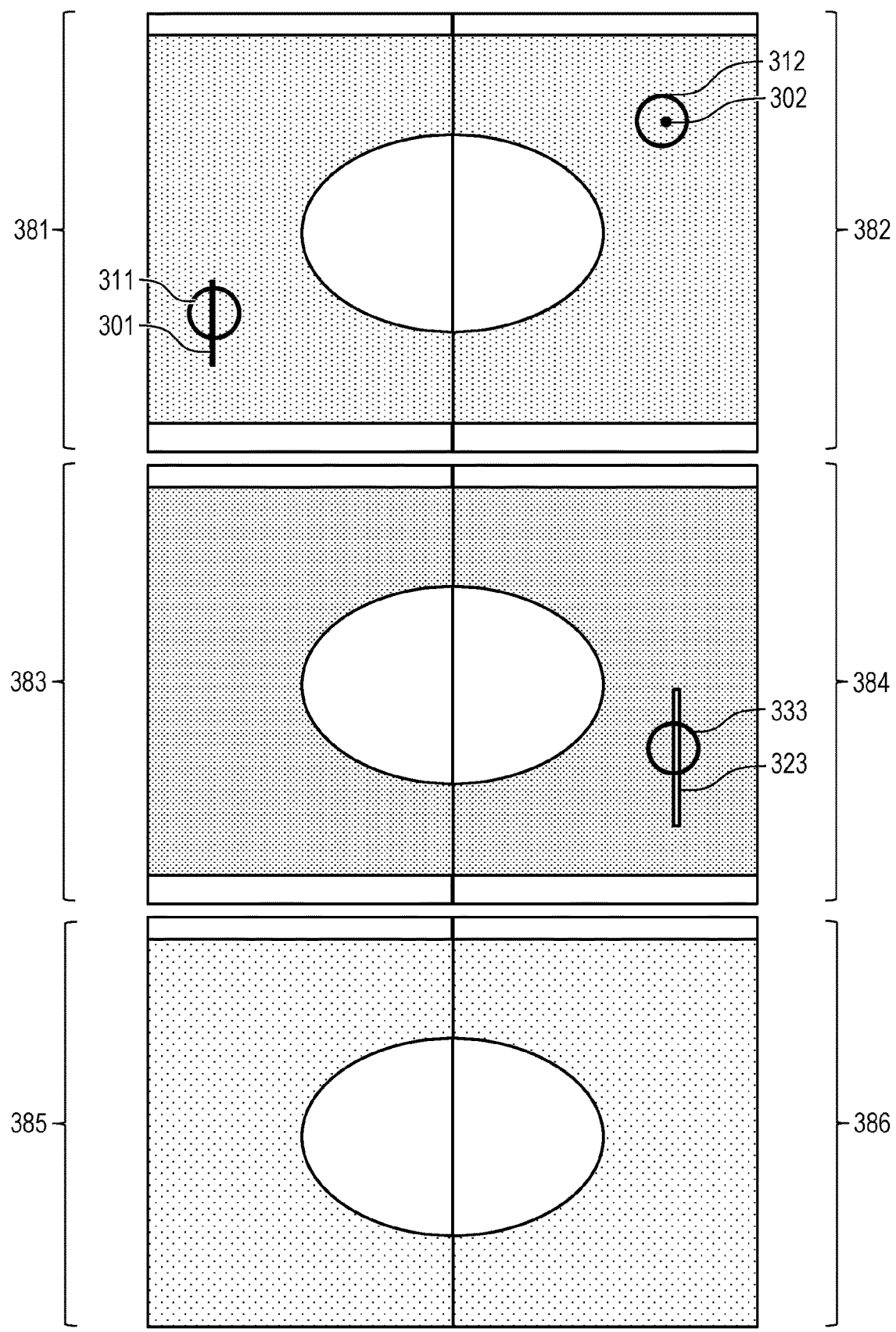
FIG. 12B is a screen example obtained by displaying an inspection result file in which inspection images are alternately arranged while being divided and to which a result bookmark hierarchy is added in a double-page spread manner.

FIG. 12B is a diagram illustrating an example in which the inspection result file of FIG. 12A is viewed in a double-page spread manner. As a result, a user can grasp the state of the entire page of a printed matter 200, can grasp that an abnormality exists, and can grasp the content of the abnormality by the title or the balloon.

Fourth Embodiment

Figure 13A:
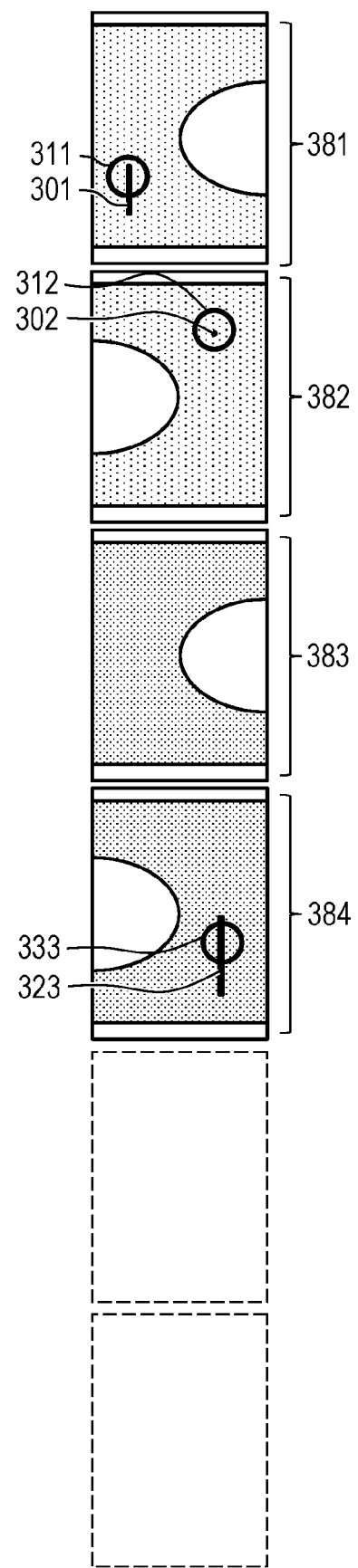
FIG. 13A is a diagram illustrating an inspection result file in which two images including no abnormality are not included and inspection images are alternately arranged while being divided, and to which a result bookmark hierarchy is added, unlike FIG. 11A.

An inspection result file of a fourth embodiment illustrated in FIG. 13A is obtained by combining inspection result data corresponding to images 381 to 384 (text data in which the coordinates of an abnormal portion are described) with the inspection result file of the second embodiment illustrated in FIG. 11A. As a result, a result bookmark hierarchy of the inspection result file can include coordinates 311 of an abnormality 301, coordinates 312 of an abnormality 302, and coordinates 333 of an abnormality 323.

By combining the inspection result data with the result bookmark hierarchy of the inspection result file, a PDF viewer can display a title or a balloon indicating an abnormality.

Figure 13B:
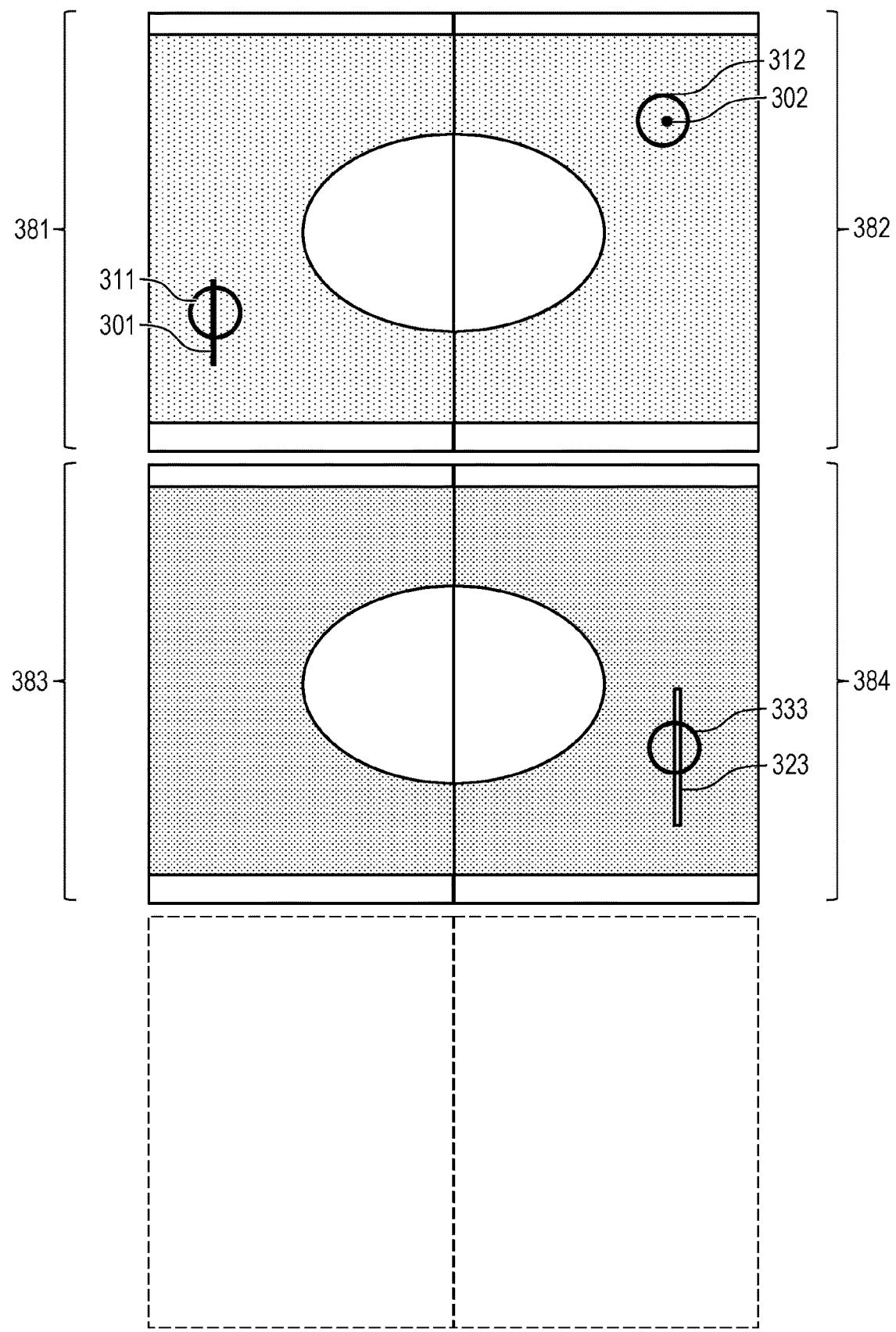
FIG. 13B is a diagram illustrating an inspection result file in which two images including no abnormality are not included and inspection images are alternately arranged while being divided, and to which a result bookmark hierarchy is added, unlike FIG. 11B.

FIG. 13B is a diagram illustrating an example in which the inspection result file of FIG. 13A is viewed in a double-page spread manner. As a result, a user can grasp the state of the entire page of a printed matter 200, can grasp that an abnormality exists, and can grasp the content of the abnormality by the title or the balloon. Furthermore, by excluding a left inspection image and a right inspection image of a third printed matter 200 including no abnormality, the inspection result file can reduce the number of pages and the file size of the inspection result file.

Fifth Embodiment

Figure 14:
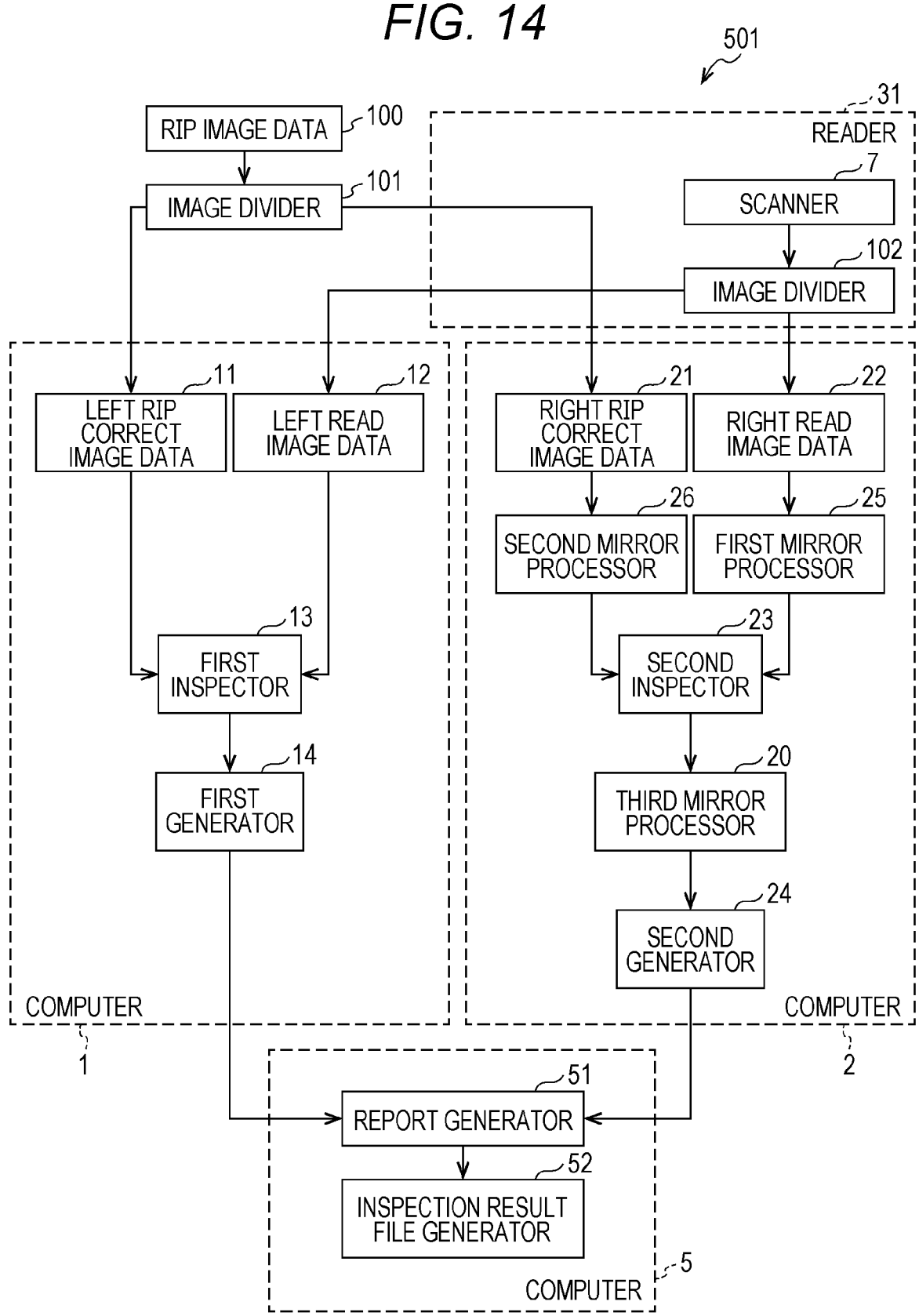
FIG. 14 is an overall configuration diagram of an image inspection system of a fifth embodiment.

FIG. 14 is an overall configuration diagram of an image inspection system 501 of a fifth embodiment. As illustrated in FIG. 14, a reader 31 of the image inspection system 501 includes a scanner 7 and an image divider 102 instead of the first scanner 3 and the second scanner 4 of the image inspection system 500 illustrated in the first embodiment. The reader 31 may comprise a central processing unit (CPU) that functions as the image divider 102 and controls the functions of the scanner 7 and/or may be connected to another device such as the computers 1, 2, 5 and the printer 6 and controlled by the CPU of the other device.

The scanner 7 reads an image formed on a printed matter 200. For example, the scanner 7 has a longer length in a main scanning direction than the width of the printed matter 200, and can be read the image at one time.

The image divider 102 divides the image read by the scanner 7 into left read image data 12 (first read image) and right read image data 22 (second read image) at a predetermined position in the main scanning direction.

As a result, the image divider 102 can divide even an image read by one scanner 7. Therefore, the first inspector 13 and the second inspector 23 can inspect the left read image data 12 and the right read image data 22 in parallel, respectively.

Therefore, the image inspection system 501 of the fifth embodiment can exhibit similar effects to those of the image inspection system 500 described in the first to fourth embodiments.

Sixth Embodiment

Figure 15:
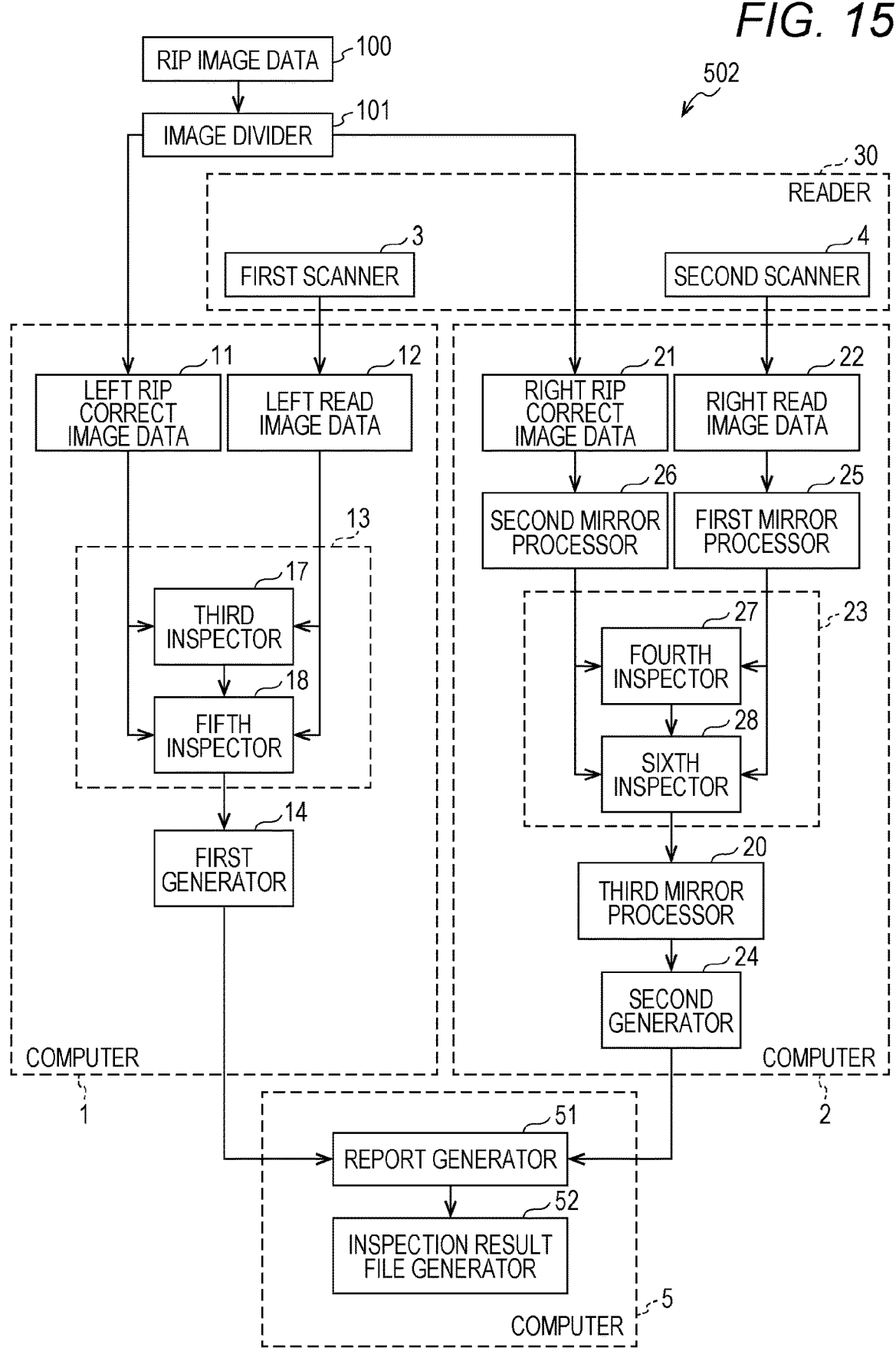
FIG. 15 is an overall configuration diagram of an image inspection system of a sixth embodiment.

FIG. 15 is an overall configuration diagram of an image inspection system 502 of a sixth embodiment. As illustrated in FIG. 15, the image inspection system 502 includes a third inspector 17 and a fifth inspector 18 in a first inspector 13, and includes a fourth inspector 27 and a sixth inspector 28 in a second inspector 23.

To the third inspector 17 and the fifth inspector 18, for example, inspectors that perform analysis according to an inspection item are assigned. Each of the third inspector 17 and the fifth inspector 18 can generate an inspection image and inspection result data (text data in which the coordinates of an abnormal portion are described) in parallel.

Meanwhile, similarly to the third inspector 17 and the fifth inspector 18, to the fourth inspector 27 and the sixth inspector 28, for example, inspectors that perform analysis according to an inspection item are assigned. Each of the fourth inspector 27 and the sixth inspector 28 can generate an inspection image and inspection result data (text data in which the coordinates of an abnormal portion are described) in parallel.

As a result, the image inspection system 502 of the sixth embodiment can further improve performance of an inspection, and can perform image inspection even with a lower-speed computer. Furthermore, in the image inspection system 502 of the sixth embodiment, the first inspector 13 may include a plurality of inspectors, and the second inspector 23 may include a plurality of inspectors in the image inspection system 501 of the fifth embodiment.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An image inspection apparatus comprising:
  a reader that reads an image formed on a recording medium;
  a first processor that:
    inspects a first read image including one of divided images obtained by dividing the image at a predetermined position in a main scanning direction, and generates first inspection image data based on an inspection result of the first read image;
  a second processor that:
    inspects a second read image including another of the divided images obtained by dividing the image, and generates second inspection image data based on an inspection result of the second read image; and
  a third processor that generates a report in which the first inspection image data and the second inspection image data are arranged in an order alternately in units of pages within the report, wherein
  the first inspection image data and the second inspection image data are displayed in a double-page spread manner by a viewer correspondingly to arrangement of the first read image and the second read image,
  the first processor adds information on the order within the report to the first inspection image data, and
  the second processor adds the information on the order within the report to the second inspection image data.

2. The image inspection apparatus according to claim 1, wherein
  the reader comprises a first reader and a second reader arranged at different positions in the main scanning direction of the recording medium.

3. The image inspection apparatus according to claim 1, wherein
  the reader comprises a central processing unit (CPU) that divides the image into the first read image and the second read image at the predetermined position.

4. The image inspection apparatus according to claim 1, wherein
  in the information on the order, the first inspection image data and the second inspection image data are continuous.

5. The image inspection apparatus according to claim 4, wherein
  in the information on the order, the first inspection image data and the second inspection image data are alternately continuous.

6. The image inspection apparatus according to claim 1, wherein
  the first processor transmits pieces of the first inspection image data one by one, and
  the second processor transmits pieces of the second inspection image data one by one.

7. The image inspection apparatus according to claim 1, wherein
  the first processor collectively transmits a plurality of pieces of the first inspection image data, and
  the second processor collectively transmits a plurality of pieces of the second inspection image data.

8. The image inspection apparatus according to claim 1, wherein
  the third processor generates the first inspection image data and the second inspection image data in units of one page and alternately allocates the first inspection image data and the second inspection image data.

9. The image inspection apparatus according to claim 1, wherein
  the first inspection image data includes the inspection result of the first read image, and
  the second inspection image data includes the inspection result of the second read image.

10. The image inspection apparatus according to claim 1, wherein
  upon detecting abnormality in either the first read image or the second read image, the first processor or the second processor generates another inspection image data.

11. The image inspection apparatus according to claim 1, wherein
  the first processor adds information on the reader that has read the first read image to the first inspection image data, and the second processor adds information on the reader that has read the second read image to the second inspection image data.

12. The image inspection apparatus according to claim 1, wherein
one of the first processor and the second processor further comprises:
a first mirror processor that mirror-inverts the first read image or the second read image;
a second mirror processor that mirror-inverts correct image data corresponding to the inverted first read image or the inverted second read image; and
a third mirror processor that mirror-inverts the inspection result of the first read image or the inspection result of the second read image, and
the first processor compares the first read image with the correct image data for inspection, or
the second processor compares the second read image with the correct image data for inspection.

13. An image inspection method comprising:
reading an image formed on a recording medium;
inspecting a first read image including one of divided images obtained by dividing the image at a predetermined position in a main scanning direction;
generating first inspection image data based on an inspection result of the first read image;
inspecting a second read image including another of the divided images obtained by dividing the image;
generating second inspection image data based on an inspection result of the second read image;
generating a report in which the first inspection image data and the second inspection image data are arranged in an order alternately in units of pages within the report, wherein
the first inspection image data and the second inspection image data are displayed in a double-page spread manner by a viewer correspondingly to arrangement of the first read image and the second read image;
adding information on the order within the report to the first inspection image data; and
adding the information on the order within the report to the second inspection image data.

14. An image inspection system comprising:
a reader that reads an image formed on a recording medium;
a first processor that:
inspects a first read image including one of divided images obtained by dividing the image at a predetermined position in a main scanning direction, and
generates first inspection image data based on an inspection result of the first read image;
a second processor that:
inspects a second read image including another of the divided images obtained by dividing the image, and
generates second inspection image data based on an inspection result of the second read image; and
and
a third processor that generates a report in which the first inspection image data and the second inspection image data are arranged in an order alternately in units of pages within the report, wherein
the first inspection image data and the second inspection image data are displayed in a double-page spread manner by a viewer correspondingly to arrangement of the first read image and the second read image,
the first processor adds information on the order within the report to the first inspection image data, and
the second processor adds the information on the order within the report to the second inspection image data.

* * * * *